US010230979B2

(12) United States Patent
Deshpande

(10) Patent No.: US 10,230,979 B2
(45) Date of Patent: Mar. 12, 2019

(54) VIDEO DECODER WITH SIGNALING

(71) Applicant: Huawei Technologies Co., Ltd., Shenzhen (CN)

(72) Inventor: Sachin G. Deshpande, Camas, WA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 35 days.

(21) Appl. No.: 15/480,158

(22) Filed: Apr. 5, 2017

(65) Prior Publication Data

US 2017/0208342 A1    Jul. 20, 2017

Related U.S. Application Data

(63) Continuation of application No. 14/156,115, filed on Jan. 15, 2014, now Pat. No. 9,674,524.

(Continued)

(51) Int. Cl.
*H04N 19/58*    (2014.01)
*H04N 19/513*    (2014.01)
(Continued)

(52) U.S. Cl.
CPC ........... *H04N 19/58* (2014.11); *H04N 19/105* (2014.11); *H04N 19/172* (2014.11);
(Continued)

(58) Field of Classification Search
CPC .................................................. H04N 19/58
See application file for complete search history.

(56) References Cited

U.S. PATENT DOCUMENTS

2012/0230401 A1    9/2012  Chen et al.
2012/0269275 A1    10/2012 Hannuksela
(Continued)

FOREIGN PATENT DOCUMENTS

CN    101496407 A    7/2009
CN    104067620 A    9/2014
(Continued)

OTHER PUBLICATIONS

Ramasubramonian et al., "AHG13: Signalling of long-term reference pictures in the slice header," Joint Collaborative Team on Video Coding (JCT-VC) of ITU-T SG 16 WP 3 and ISO/IEC JTC 1/SC 29/WG 11, 10th Meeting, Stockholm, Sweden, Document JCTVC-J0115 (Jul. 11-20, 2012).

(Continued)

*Primary Examiner* — Tracy Y. Li
(74) *Attorney, Agent, or Firm* — Leydig, Voit & Mayer, Ltd.

(57) ABSTRACT

A method of decoding a video bitstream is disclosed. The method includes: using a set of previously decoded pictures for decoding a subsequent picture; receiving a delta_poc_msb_present_flag indicating whether a delta_poc_msb_cycle_lt is present or not present, wherein the delta_poc_msb_cycle_lt being present indicates that more than one reference picture in the set of previously decoded pictures having same value, wherein the first previously decoded picture has a temporal ID being equal to zero, is not a RASL picture, not a RADL picture, not a sub-layer non-reference picture.

8 Claims, 17 Drawing Sheets

Related U.S. Application Data

(60) Provisional application No. 61/752,937, filed on Jan. 15, 2013.

(51) Int. Cl.

| | | |
|---|---|---|
| *H04N 19/423* | (2014.01) | |
| *H04N 19/436* | (2014.01) | |
| *H04N 19/70* | (2014.01) | |
| *H04N 19/105* | (2014.01) | |
| *H04N 19/172* | (2014.01) | |
| *H04N 19/174* | (2014.01) | |

(52) U.S. Cl.
CPC ......... *H04N 19/174* (2014.11); *H04N 19/423* (2014.11); *H04N 19/436* (2014.11); *H04N 19/513* (2014.11); *H04N 19/70* (2014.11)

(56) References Cited

U.S. PATENT DOCUMENTS

| | | | |
|---|---|---|---|
| 2013/0070859 A1 | 3/2013 | Lu et al. | |
| 2013/0077687 A1* | 3/2013 | Wang | H04N 19/105 375/240.15 |
| 2013/0114741 A1 | 5/2013 | Sullivan et al. | |
| 2013/0142257 A1 | 6/2013 | Wang et al. | |
| 2013/0188709 A1 | 7/2013 | Deshpande et al. | |
| 2013/0272430 A1* | 10/2013 | Sullivan | H04N 19/70 375/240.26 |
| 2014/0050270 A1 | 2/2014 | Lim et al. | |
| 2014/0064363 A1 | 3/2014 | Samuelsson et al. | |
| 2014/0140406 A1 | 5/2014 | Yu et al. | |
| 2014/0205021 A1* | 7/2014 | Hannuksela | H04N 19/463 375/240.26 |
| 2014/0286416 A1* | 9/2014 | Jeon | H04N 19/593 375/240.12 |
| 2014/0301473 A1* | 10/2014 | Park | H04N 19/58 375/240.16 |
| 2015/0245063 A1 | 8/2015 | Rusanovskyy et al. | |

FOREIGN PATENT DOCUMENTS

| | | |
|---|---|---|
| WO | 2012023817 A2 | 2/2012 |
| WO | 2012148139 A2 | 11/2012 |
| WO | 2013082471 A1 | 6/2013 |
| WO | 2013111605 A1 | 8/2013 |
| WO | 2013158024 A1 | 10/2013 |
| WO | 2014006854 A1 | 1/2014 |

OTHER PUBLICATIONS

Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting, Shanghai, China, Document JCTVC-K1003_v13 (Oct. 10-19, 2012).

Hendry et al., "AHG9: On RPS derivation and marking process for long-term reference pictures," Joint Collaborative Team on Video Coding (JCT-VC) of ITU-T SG 16 WP 3 and ISO/IEC JTC 1/SC 291WG 11, 12th Meeting, Geneva, Switzerland, Document JCTVC-L0254_r1 (Jan. 14-23, 2013).

"Test Model under Consideration," Joint Collaborative Team on Video Coding (JCT-VC) of ITU-T SG16 WP3 and ISO/IEC JTC1/SC29/WG11, 1st Meeting, Dresden, Germany, Document JCTVC-A205 (Apr. 15-23, 2010).

"Information technology—Coding of audio-visual objects—Part 10: Advanced Video Coding," International Standard ISO/IEC 14496-10, Second edition, pp. i-267 International Organization for Standardization, Geneva, Switzerland (Oct. 1, 2004). total 280 pages.

ITU-T H.264, "Series H: Audiovisual and Multimedia Systems Infrastructure of audiovisual services—Coding of moving video, Advanced video coding for generic audiovisual services," (Jan. 2012), total 680 pages.

Hendry et al., "AHG21: Comments on Signaling of Long-term Reference Pictures,"Joint Collaborative Team on Video Coding (JCT-VC) of ITU-T SG16 WP3 and ISO/IEC JTC1/SC29/WG11, 8th Meeting, San Jose, California, Document JCTVC-H0200 (Feb. 1-10, 2012).

Boyce et al., "BoG report on Decoded picture buffering and reference picture signaling,"Joint Collaborative Team on Video Coding (JCT-VC) of ITU-T SG16 WP3 and ISO/IEC JTC1/SC29/WG11, 8th Meeting, San Jose, California, Document JCTVC-H0715 (Feb. 1-10, 2012).

Ramasubramonian et al., "AHG13: On signalling of MSB cycle for long-term reference pictures," Joint Collaborative Team on Video Coding (JCT-VC) of ITU-T SG 16 WP 3 and ISO/IEC JTC 1/SC 29/WG 11, 10th Meeting, Stockholm, Sweden, Document JCTVC-J0118 (Jul. 11-20, 2012).

Man et al., "Research on Crucial Technologies of H.264/AVC Video Integrity Authentication," Dissertation for the Degree of Doctor of Philosophy, Hefei University of Technology, Hefei, China (Oct. 2011).

Deshpande et al.," AHG21: Comments on Signaling of Reference Pictures," Joint Collaborative Team on Video Coding (JCT-VC) of ITU-T SG16 WP3 and ISO/IEC JTC1/SC29/WG11, 8th Meeting, San Jose, California, Document JCTVC-H0531, (Feb. 1-10, 2012).

Hendry et al.,"AHG9: On RPS derivation and marking process for long-term reference pictures," Joint Collaborative Team on Video Coding (JCT-VC) of ITU-T SG 16 WP 3 and ISO/IEC JTC 1/SC 29/WG 11, 12th Meeting, Geneva, Switzerland, Document JCTVC-L0254 (Jan. 14-23, 2013).

Hendry et al., "Restriction for handling long-term reference pictures," Joint Collaborative Team on Video Coding (JCT-VC) of ITU-T SG 16 WP 3 and ISO/IEC JTC 1/SC 29/WG 11, 12th meeting, Geneva, Switzerland, Document JCTVC-L0443 (Jan. 14-23, 2013).

Ramasubramonian et al., "AHG9: Reference picture set clean-ups," Joint Collaborative Team on Video Coding (JCT-VC) of ITU-T SG 16 WP 3 and ISO/IEC JTC 1/SC 29/WG 11, 11th meeting, Shanghai, China, Document JCTVC-K0123r1 (Oct. 10-19, 2012).

Sjoberg et al., "Overview of HEVC high-level syntax and reference picture management," IEEE Draft, Institute of Electrical and Electronics Engineers, New York, New York (Jan. 2012).

Samuelsson et al., "Single inclusion of long-term reference pictures in RPS," Joint Collaborative Team on Video Coding (JCT-VC) of ITU-T Sg 16 WP 3 and ISO/IEC JTC 1/SC 29/WG 11, 11th meeting, Shanghai, China, Document JCTVC-K0235 (Oct. 10-19, 2012).

Weigand et al., "WD1: Working Draft 1 of High-Efficiency Video Coding," Joint Collaborative Team on Video Coding (JCT-VC) of ITU-T SG16 WP3 and ISO/IEC JTC1/SC29/WG11, 3rd meeting, Guangzhou, China, Document JCTVC-C403 (Oct. 7-15, 2012).

Bross et al., "WD5: Working Draft 5 of High-Effiency Video Coding," Joint Collaborative Team on Video Coding (JCT-VC) of ITU-T SG16 WP3 and ISO/IEC JTC1/SC29/WG 11, 7th meeting, Geneva, Switzerland, Document JCTV-G1103_d6 (Nov. 21-30, 2011).

\* cited by examiner

Pictures for which delta_poc_msb_present_flag[i] is set to 1

VIDEO DECODER WITH SIGNALING

CROSS-REFERENCE TO RELATED APPLICATIONS

This application is a continuation of U.S. patent application Ser. No. 14/156,115, filed on Jan. 15, 2014, which claims priority to U.S. Provisional Application No. 61/752,937, filed on Jan. 15, 2013. The afore-mentioned patent applications are hereby incorporated by reference in their entireties.

BACKGROUND OF THE INVENTION

The present invention relates to video encoding and/or decoding.

Digital video is typically represented as a series of images or frames, each of which contains an array of pixels. Each pixel includes information, such as intensity and/or color information. In many cases, each pixel is represented as a set of three colors, each of which may be defined by eight bit color values.

Video-coding techniques, for example H.264/MPEG-4 AVC (H.264/AVC), typically provide higher coding efficiency at the expense of increasing complexity. Increasing image quality requirements and increasing image resolution requirements for video coding techniques also increase the coding complexity. Video decoders that are suitable for parallel decoding may improve the speed of the decoding process and reduce memory requirements; video encoders that are suitable for parallel encoding may improve the speed of the encoding process and reduce memory requirements.

H.264/MPEG-4 AVC [Joint Video Team of ITU-T VCEG and ISO/IEC MPEG, "H.264: Advanced video coding for generic audiovisual services," ITU-T Rec. H.264 and ISO/IEC 14496-10 (MPEG4—Part 10), November 2007], and similarly the JCT-VC, ["Draft Test Model Under Consideration", JCTVC-A205, JCT-VC Meeting, Dresden, April 2010 (JCT-VC)], both of which are incorporated by reference herein in their entirety, are video codec (encoder/decoder) specifications that decode pictures based upon reference pictures in a video sequence for compression efficiency.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

While any video coder/decoder (codec) that uses encoding/decoding may be accommodated by embodiments described herein, exemplary embodiments are described in relation to an H.264/AVC encoder and an H.264/AVC decoder merely for purposes of illustration. Many video coding techniques are based on a block-based hybrid video-coding approach, wherein the source-coding technique is a hybrid of inter-picture, also considered inter-frame, prediction, intra-picture, also considered intra-frame, prediction and transform coding of a prediction residual. Inter-frame prediction may exploit temporal redundancies, and intra-frame and transform coding of the prediction residual may exploit spatial redundancies.

Figure 1:
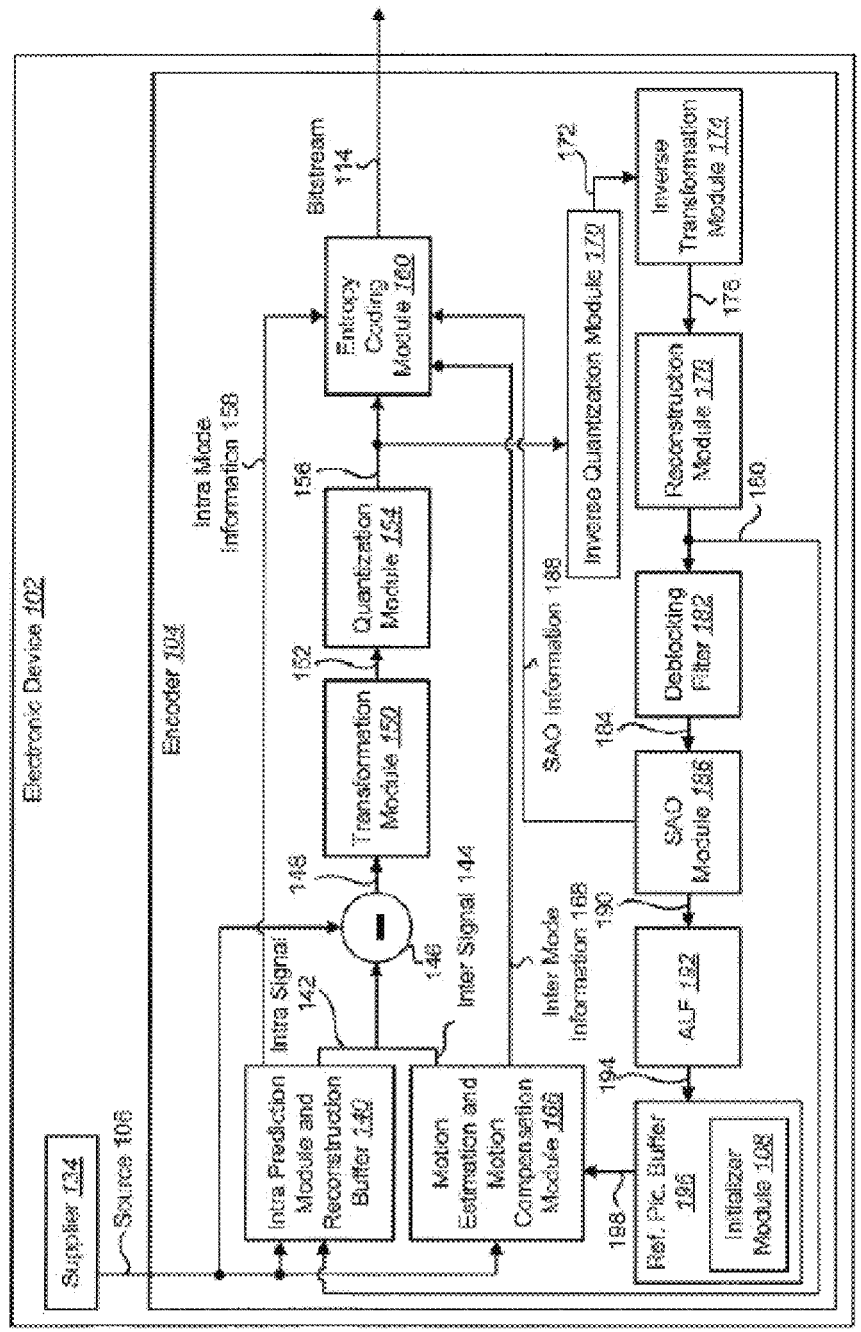
FIG. 1 illustrates a H.264/AVC video encoder.

FIG. 1 is a block diagram illustrating an exemplary encoder 104 for an electronic device 102. It should be noted that one or more of the elements illustrated as included within the electronic device 102 may be implemented in hardware, and/or software. For example, the electronic device 102 includes an encoder 104, which may be implemented in hardware and/or software.

The electronic device 102 may include a supplier 134. The supplier 134 may provide picture or image data (e.g., video) as a source 106 to the encoder 104. Non limiting examples of the supplier 134 include image sensors, memory, communication interfaces, network interfaces, wireless receivers, ports, video frame content, previously encoded video content, non-encoded video content, etc.

The source 106 may be provided to an intra-frame prediction module and reconstruction buffer 140. The source 106 may also be provided to a motion estimation and motion compensation module 166 and to a subtraction module 146.

The intra-frame prediction module and reconstruction buffer 140 may generate intra mode information 148 and an intra signal 142 based on the source 106 and reconstructed data 180. The motion estimation and motion compensation module 166 may generate inter mode information 168 and an inter signal 144 based on the source 106 and a reference picture buffer 196 signal 198.

The reference picture buffer 196 signal 198 may include data from one or more reference pictures stored in the reference picture buffer 196. The reference picture buffer 196 may also include an RPS index initializer module 108. The initializer module 108 may process reference pictures corresponding to the buffering and list construction of an RPS.

The encoder 104 may select between the intra signal 142 and the inter signal 144 in accordance with a mode. The intra signal 142 may be used in order to exploit spatial characteristics within a picture in an intra coding mode. The inter signal 144 may be used in order to exploit temporal characteristics between pictures in an inter coding mode. While in the intra coding mode, the intra signal 142 may be provided to the subtraction module 146 and the intra mode information 158 may be provided to an entropy coding module 160. While in the inter coding mode, the inter signal 144 may be provided to the subtraction module 146 and the inter mode information 168 may be provided to the entropy coding module 160.

Either the intra signal 142 or the inter signal 144 (depending on the mode) is subtracted from the source 106 at the subtraction module 146 in order to produce a prediction residual 148. The prediction residual 148 is provided to a transformation module 150. The transformation module 150 may compress the prediction residual 148 to produce a transformed signal 152 that is provided to a quantization module 154. The quantization module 154 quantizes the transformed signal 152 to produce transformed and quantized coefficients (TQCs) 156.

The TQCs 156 are provided to an entropy coding module 160 and an inverse quantization module 170. The inverse quantization module 170 performs inverse quantization on the TQCs 156 to produce an inverse quantized signal 172 that is provided to an inverse transformation module 174. The inverse transformation module 174 decompresses the inverse quantized signal 172 to produce a decompressed signal 176 that is provided to a reconstruction module 178.

The reconstruction module 178 may produce reconstructed data 180 based on the decompressed signal 176. For example, the reconstruction module 178 may reconstruct (modified) pictures. The reconstructed data 180 may be provided to a deblocking filter 182 and to the intra prediction module and reconstruction buffer 140. The deblocking filter 182 may produce a filtered signal 184 based on the reconstructed data 180.

The filtered signal 184 may be provided to a sample adaptive offset (SAO) module 186. The SAO module 186 may produce SAO information 188 that is provided to the entropy coding module 160 and an SAO signal 190 that is provided to an adaptive loop filter (ALF) 192. The ALF 192 produces an ALF signal 194 that is provided to the reference picture buffer 196. The ALF signal 194 may include data from one or more pictures that may be used as reference pictures.

The entropy coding module 160 may code the TQCs 156 to produce a bitstream 114. Also, the entropy coding module 160 may code the TQCs 156 using Context-Adaptive Variable Length Coding (CAVLC) or Context-Adaptive Binary Arithmetic Coding (CABAC). In particular, the entropy coding module 160 may code the TQCs 156 based on one or more of intra mode information 158, inter mode information 168 and SAO information 188. The bitstream 114 may include coded picture data. The encoder often encodes a frame as a sequence of blocks, generally referred to as macroblocks.

Quantization, involved in video compression such as HEVC, is a lossy compression technique achieved by compressing a range of values to a single value. The quantization parameter (QP) is a predefined scaling parameter used to perform the quantization based on both the quality of reconstructed video and compression ratio. The block type is defined in HEVC to represent the characteristics of a given block based on the block size and its color information. QP, resolution information and block type may be determined before entropy coding. For example, the electronic device 102 (e.g., the encoder 104) may determine the QP, resolution information and block type, which may be provided to the entropy coding module 160.

The entropy coding module 160 may determine the block size based on a block of TQCs 156. For example, block size may be the number of TQCs 156 along one dimension of the block of TQCs. In other words, the number of TQCs 156 in the block of TQCs may be equal to block size squared. For instance, block size may be determined as the square root of the number of TQCs 156 in the block of TQCs. Resolution may be defined as a pixel width by a pixel height. Resolution information may include a number of pixels for the width of a picture, for the height of a picture or both. Block size may be defined as the number of TQCs 156 along one dimension of a 2D block of TQCs.

In some configurations, the bitstream 114 may be transmitted to another electronic device. For example, the bitstream 114 may be provided to a communication interface, network interface, wireless transmitter, port, etc. For instance, the bitstream 114 may be transmitted to another electronic device via LAN, the Internet, a cellular phone base station, etc. The bitstream 114 may additionally or alternatively be stored in memory on the electronic device 102 or other electronic device.

Figure 2:
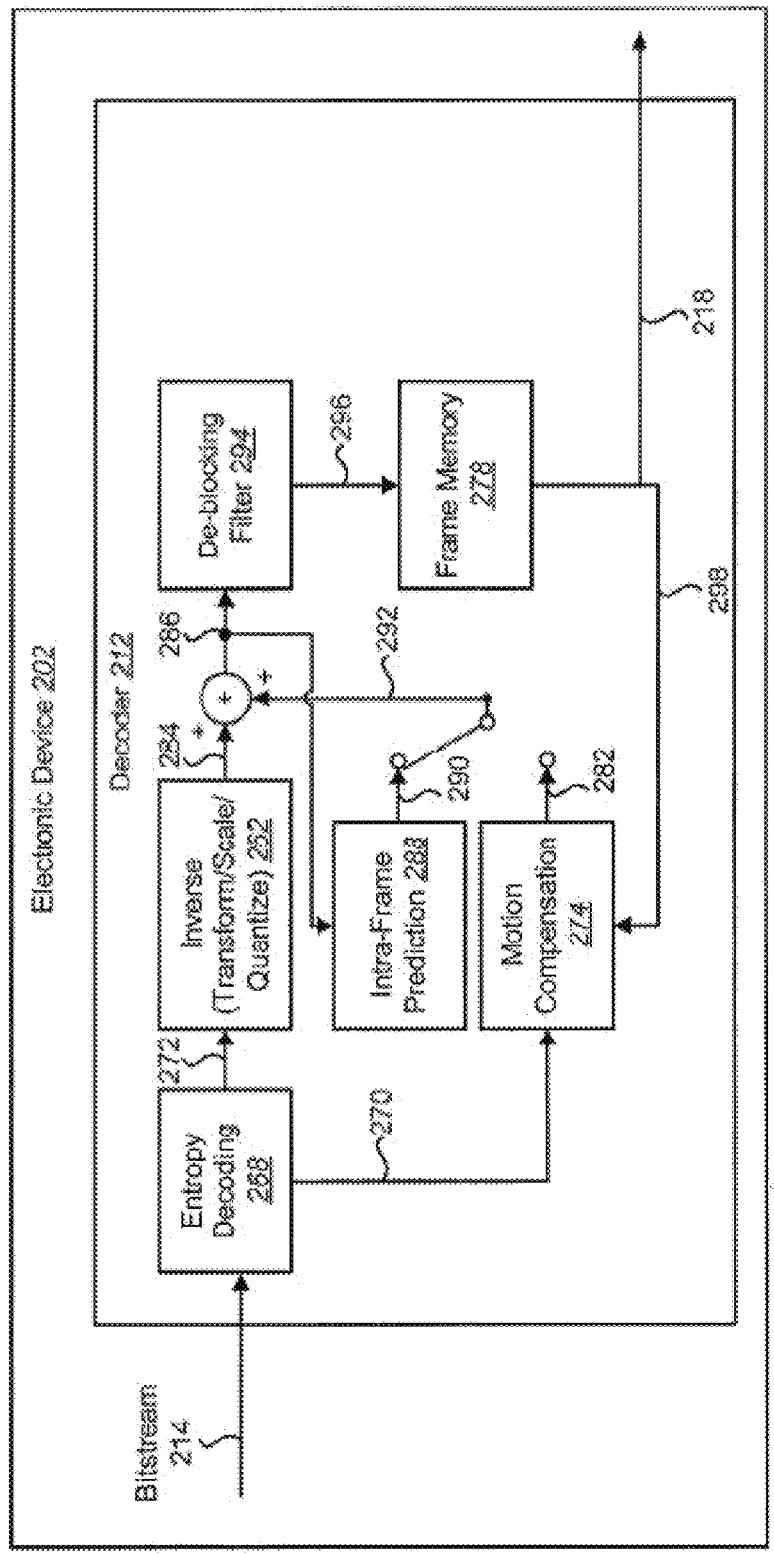
FIG. 2 illustrates a H.264/AVC video decoder.

FIG. 2 is a block diagram illustrating an exemplary decoder 212 on an electronic device 202. The decoder 212 may be included for an electronic device 202. For example, the decoder 212 may be a HEVC decoder. The decoder 212 and/or one or more of the elements illustrated as included in the decoder 212 may be implemented in hardware and/or software. The decoder 212 may receive a bitstream 214 (e.g., one or more encoded pictures included in the bitstream 214) for decoding. In some configurations, the received bitstream 214 may include received overhead information, such as a received slice header, received PPS, received buffer description information, etc. The encoded pictures included in the bitstream 214 may include one or more encoded reference pictures and/or one or more other encoded pictures.

Received symbols (in the one or more encoded pictures included in the bitstream 214) may be entropy decoded by an entropy decoding module 268, thereby producing a motion information signal 270 and quantized, scaled and/or transformed coefficients 272.

The motion information signal 270 may be combined with a portion of a reference frame signal 298 from a frame memory 278 at a motion compensation module 274, which may produce an inter-frame prediction signal 282. The quantized, descaled and/or transformed coefficients 272 may be inverse quantized, scaled and inverse transformed by an inverse module 262, thereby producing a decoded residual signal 284. The decoded residual signal 284 may be added to a prediction signal 292 to produce a combined signal 286. The prediction signal 292 may be a signal selected from either the inter-frame prediction signal 282 or an intra-frame prediction signal 290 produced by an intra-frame prediction module 288. In some configurations, this signal selection may be based on (e.g., controlled by) the bitstream 214.

The intra-frame prediction signal 290 may be predicted from previously decoded information from the combined signal 292 (in the current frame, for example). The combined signal 292 may also be filtered by a de-blocking filter 294. The resulting filtered signal 296 may be written to frame memory 278. The resulting filtered signal 296 may include a decoded picture.

The frame memory 778 may include a DPB as described herein. The DPB may include one or more decoded pictures that may be maintained as short or long term reference frames. The frame memory 278 may also include overhead information corresponding to the decoded pictures. For example, the frame memory 278 may include slice headers, PPS information, cycle parameters, buffer description information, etc. One or more of these pieces of information may be signaled from an encoder (e.g., encoder 104). The frame memory 278 may provide a decoded picture 718.

An input picture comprising a plurality of macroblocks may be partitioned into one or several slices. The values of the samples in the area of the picture that a slice represents may be properly decoded without the use of data from other slices provided that the reference pictures used at the encoder and the decoder are the same and that de-blocking filtering does not use information across slice boundaries. Therefore, entropy decoding and macroblock reconstruction for a slice does not depend on other slices. In particular, the entropy coding state may be reset at the start of each slice. The data in other slices may be marked as unavailable when defining neighborhood availability for both entropy decoding and reconstruction. The slices may be entropy decoded and reconstructed in parallel. No intra prediction and motion-vector prediction is preferably allowed across the boundary of a slice. In contrast, de-blocking filtering may use information across slice boundaries.

Figure 3:
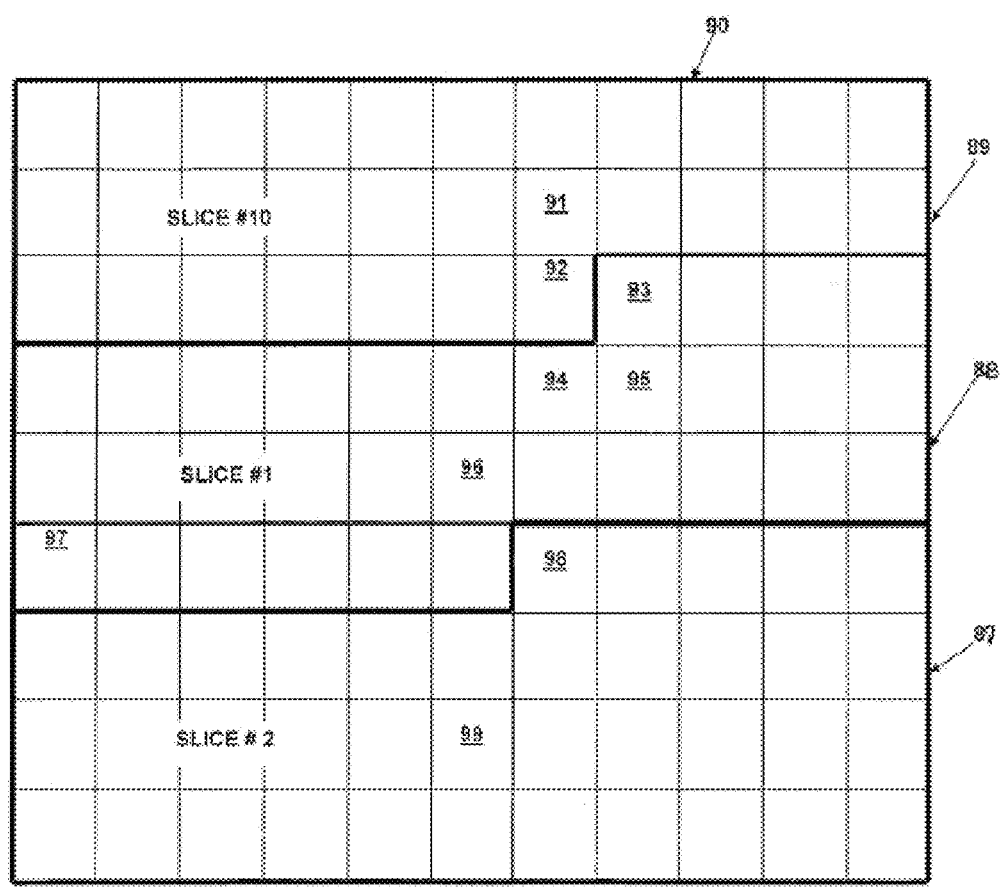
FIG. 3 illustrates an exemplary slice structure.

FIG. 3 illustrates an exemplary video picture 90 comprising eleven macroblocks in the horizontal direction and nine macroblocks in the vertical direction (nine exemplary macroblocks labeled 91-99). FIG. 3 illustrates three exemplary slices: a first slice denoted "SLICE #0" 89, a second slice denoted "SLICE #1" 88 and a third slice denoted "SLICE #2" 87. An H.264/AVC decoder may decode and reconstruct the three slices 87, 88, 89 in parallel. Each of the slices may be transmitted in scan line order in a sequential manner. At the beginning of the decoding/reconstruction process for each slice, entropy decoding 268 is initialized or reset and macroblocks in other slices are marked as unavailable for both entropy decoding and macroblock reconstruction. Thus, for a macroblock, for example, the macroblock labeled 93, in "SLICE #1," macroblocks (for example, macroblocks labeled 91 and 92) in "SLICE #0" may not be used for entropy decoding or reconstruction. Whereas, for a macroblock, for example, the macroblock labeled 95, in "SLICE #1," other macroblocks (for example, macroblocks labeled 93 and 94) in "SLICE #1" may be used for entropy decoding or reconstruction. Therefore, entropy decoding and macroblock reconstruction proceeds serially within a slice. Unless slices are defined using a flexible macroblock ordering (FMO), macroblocks within a slice are processed in the order of a raster scan.

Flexible macroblock ordering defines a slice group to modify how a picture is partitioned into slices. The macroblocks in a slice group are defined by a macroblock-to-slice-group map, which is signaled by the content of the picture parameter set and additional information in the slice headers. The macroblock-to-slice-group map consists of a slice-group identification number for each macroblock in the picture. The slice-group identification number specifies to which slice group the associated macroblock belongs. Each slice group may be partitioned into one or more slices, wherein a slice is a sequence of macroblocks within the same slice group that is processed in the order of a raster scan within the set of macroblocks of a particular slice group. Entropy decoding and macroblock reconstruction proceeds serially within a slice group.

Figure 4:
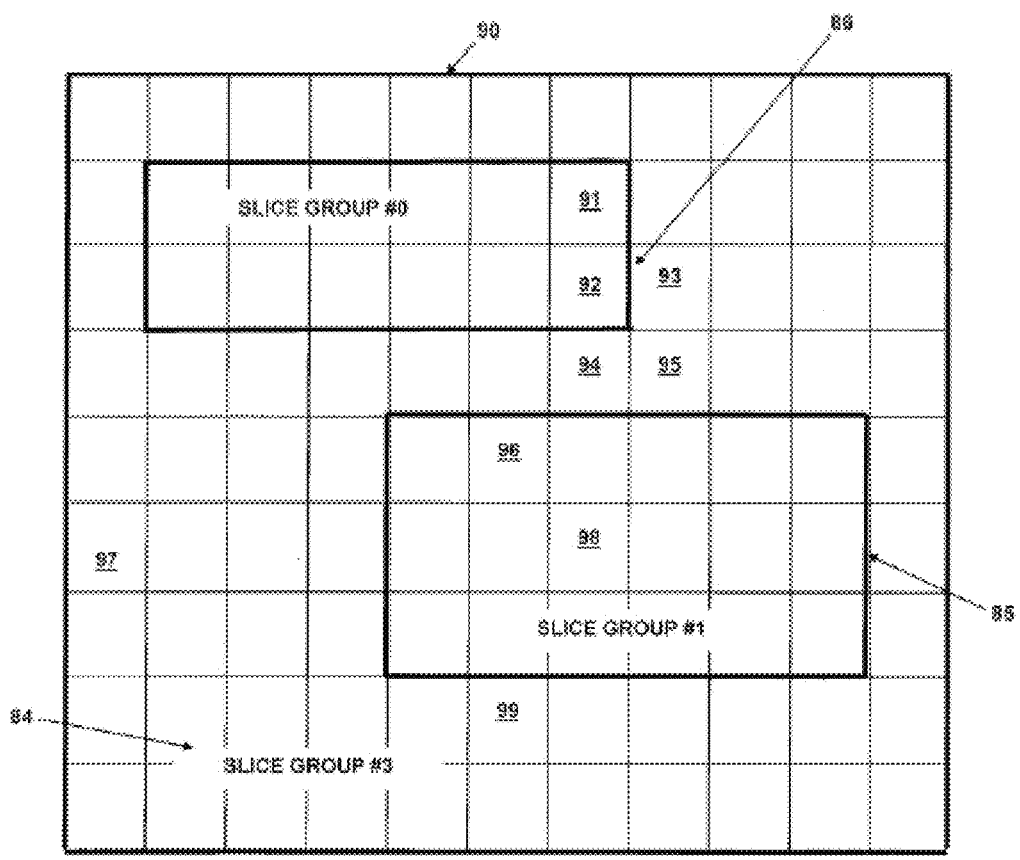
FIG. 4 illustrates another exemplary slice structure.

FIG. 4 depicts an exemplary macroblock allocation into three slice groups: a first slice group denoted "SLICE GROUP #0" 86, a second slice group denoted "SLICE GROUP #1" 85 and a third slice group denoted "SLICE GROUP #2" 84. These slice groups 84, 85, 86 may be associated with two foreground regions and a background region, respectively, in the picture 90.

A picture may be partitioned into one or more slices, wherein a slice may be self-contained in the respect that values of the samples in the area of the picture that the slice represents may be correctly reconstructed without use of data from other slices, provided that the references pictures used are identical at the encoder and the decoder. All reconstructed macroblocks within a slice may be available in the neighborhood definition for reconstruction.

A slice may be partitioned into more than one entropy slice, wherein an entropy slice may be self-contained in the respect that the area of the picture that the entropy slice represents may be correctly entropy decoded without the use of data from other entropy slices. The entropy decoding 268 may be reset at the decoding start of each entropy slice. The data in other entropy slices may be marked as unavailable when defining neighborhood availability for entropy decoding.

A device configured for decoding pictures obtains or otherwise receives a bitstream that includes a series of pictures, including a current picture. The device further obtains a reference picture set (RPS) parameter that may be used for the identification of other frames that may be used for the decoding of the current picture or pictures subsequent to the current picture in the order that pictures are signaled in the bitstream.

A RPS provides an identification of a set of reference pictures associated with the current frame. A RPS may identify reference pictures that are prior to the current picture in decoding order that may be used for inter prediction of the current picture and/or identify reference pictures that are after the current picture in decoding order that may be used for inter prediction of the current picture. For example, if the system receives frame 1, 3, 5 and 5 uses 3 for reference, and, an encoder uses frame 1 for the prediction of frame 7. Then, the RPS for 5 may signal to keep both frame 3 and 1 in the frame memory 278 even though frame 1 is not used for reference of frame 5. In one embodiment, the RPS for 5 may be [−2 −4]. Additionally, the frame memory 278 may be referred to the display picture buffer, or equivalently DPB.

A RPS describes one or more reference pictures that should be maintained, at least for a limited time duration, in the decoded picture buffer (DPB) for subsequent use. This identification of the RPS may be included in the slice header of each picture, together with a picture, and/or together with a group of pictures. Additionally a list of RPS may be sent in a picture parameter set (PPS). Then slice header may refer to one of the RPS sent in the PPS to signal its use in that slice. For example, a RPS for a group of pictures may be signaled in a picture parameter set (PPS). Any pictures in the DPB that are not a part of the RPS for the current frame may be marked as "unused for reference."

A DPB may be used to store reconstructed (e.g., decoded) pictures at the decoder. These stored pictures may then be used, for example, in an inter-prediction technique. Also, a picture in the DPB may be associated with a picture order count (POC). The POC may be a variable that is associated with each encoded picture and that has a value that increases with increasing picture position in an output order. In other words, the POC may be used by the decoder to deliver the pictures in the correct order for display. The POC may also be used for identification of reference pictures during construction of a reference picture list and identification of decoded reference pictures. Furthermore, the POC may be used for identification of pictures that are lost during transmission from an encoder to a decoder.

Figure 5:
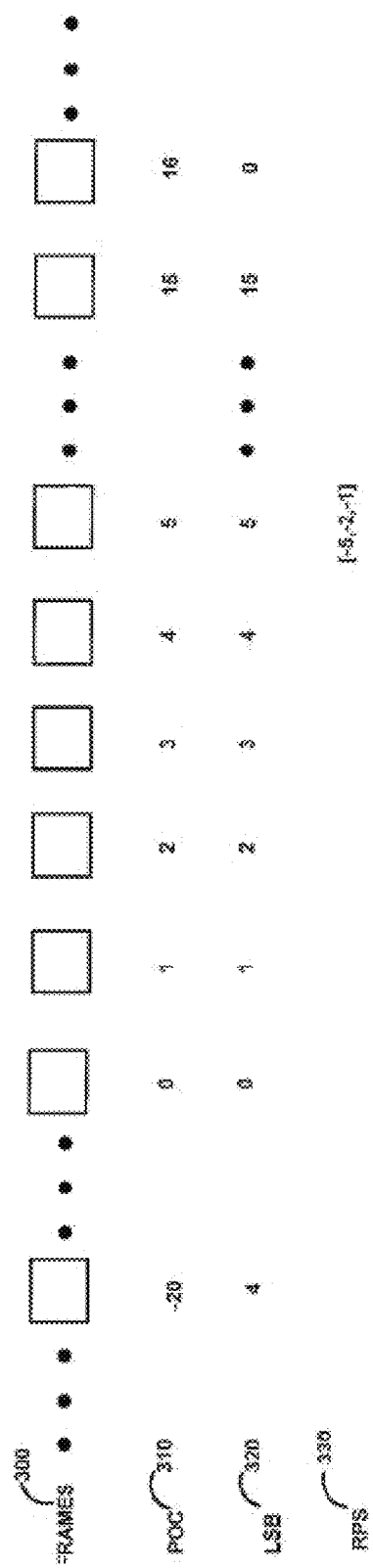
FIG. 5 illustrates reconstruction of an entropy slice.

Referring to FIG. 5, one example of a set of frames 300 provided from an encoder to a decoder is illustrated. Each of the frames may have an associated POC 310. As illustrated, the POC may increment from a minus number though a large positive number. In some embodiments, the POC may only increment from zero through a larger positive number. The POC is typically incremented by one for each frame, but in some cases one or more POC are skipped or otherwise omitted. For example, the POC for a set of frames in the encoder may be, 0, 1, 2, 3, 4, 5, etc. For example, the POC for the same or another set of frames in the encoder may be, 0, 1, 2, 4, 5, etc., with POC 3 being skipped or otherwise omitted.

As the POC becomes sufficiently large, a significant number of bits would be necessary to identify each frame using the POC. The encoder may reduce the number of bits used to identify a particular POC by using a selected number of least significant bits (LSB) of the POC to identify each frame, such as 4. Since the reference frames used for decoding the current frame are often temporally located proximate to the current frame, this identification technique is suitable and results in a reduction in the computational complexity of the system and an overall reduction in the bit rate of the video. The number of LSB to use to identify the pictures may be signaled in the bit stream to the decoder.

As illustrated, with LSB being 4 bits, the LSB index repeats every 16 values (2^4) when the selected number of LSB of the POC is 4. Thus, frame 0 has a LSB having a value of 0, frame 1 has a LSB having a value of 1, . . . , frame 14 has a LSB having a value of 14, frame 15 has a LSB having a value of 15. However, frame 16 again has a LSB having a value of 0, frame 17 again has a LSB having a value of 1, and frame 20 has a LSB having a value of 4. The LSB identifier (generally also referred to as the LSB of the POC or, equivalently, POC LSB) may have the characteristic of LSB=POC % 16, where % is the remainder after dividing by 16 (2^ number of least significant bits which in this case is 4). Similarly, if the selected number of LSBs to identify a POC is N bits, the LSB identifier may have the characteristic of LSB=POC % (2^N) where 2^N denotes 2 raised to the power of N. Rather than including the POC in the bitstream to identify frames, the encoder preferably provides the LSB index (generally also referred to as the LSB of the POC or, equivalently, POC LSB), in the bitstream to the decoder.

The reference frames used for inter prediction of a current frame, or frames subsequent to the current frame, may be identified with an RPS using either relative (e.g., delta) referencing (using a deltaPOC and a currentPOC, for example) or absolute referencing (using the POC, for example). For example, the frame identified by POC 5 310 and signaled to the decoder as LSB 5 320 in the bitstream may have an associated RPS 330 of [−5, −2, −1]. The meaning of the RPS values is described later.

Figure 6:
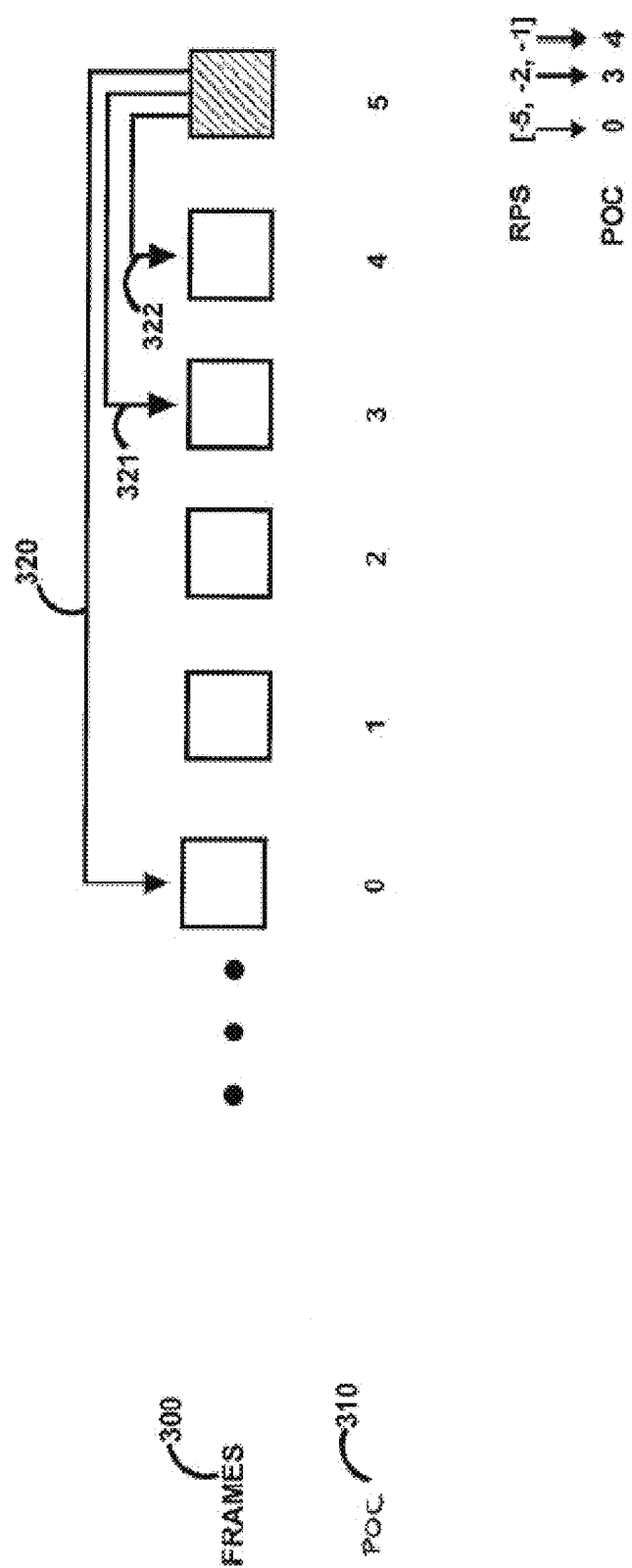
FIG. 6 illustrates reconstruction of an portion of the entropy slice of FIG. 5.

Referring to FIG. 6, illustrating a portion of FIG. 5, the RPS of [−5, −2, −1] refers to frames that include the fifth previous frame 320, second previous frame 321, and first previous frame 322. This in turn refers to the POC values of 0, 3, and 4, respectively as illustrated in FIG. 6. Typically, the RPS refers to the difference in between the POC value of the current frame and the POC value of the previous frame. For example, the RPS of [−5, −2, −1] for a current frame having a POC value of 5, refers to frames having POC values of 5 minus 5=0; 5 minus 2=3; and 5 minus 1=4. Please note that although not shown in the example here the RPS can also include frames in the future. These will be indicated with positive delta PCO values in RPS.

Figure 7:
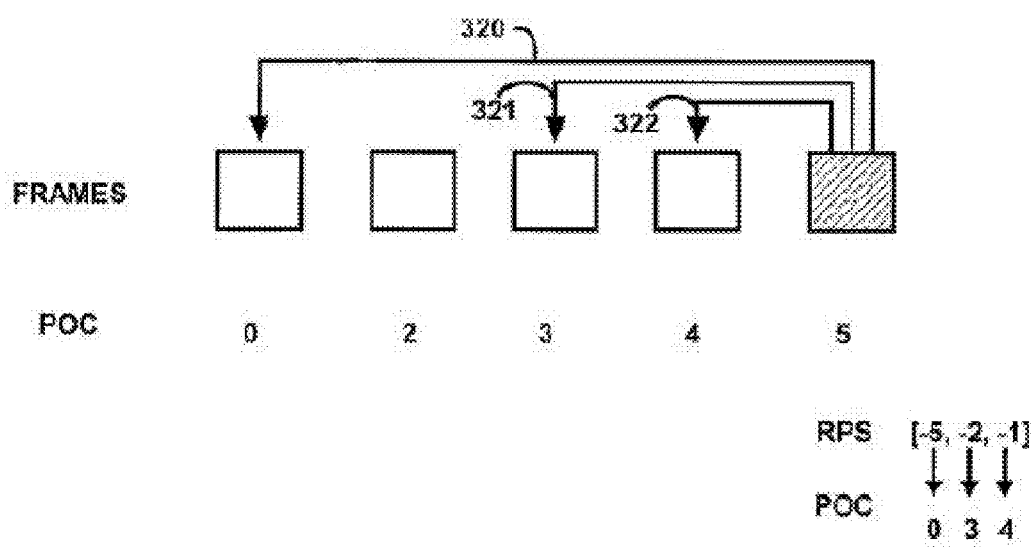
FIG. 7 illustrates reconstruction of an entropy slice with an omitted LSB count value.

In the case that the POC values are not sequential, such as in the case that one or more POC values are skipped or otherwise omitted in parts of the bitstream, the difference between the POC value of the current frame and POC value of the previous frame may be different than the number of frames output between the previous frame and current frame such as illustrated in FIG. 7. The RPS may be signaled in the bitstream in any suitable manner, such as provided together with the frame or provided together with a set of frames.

Figure 8:
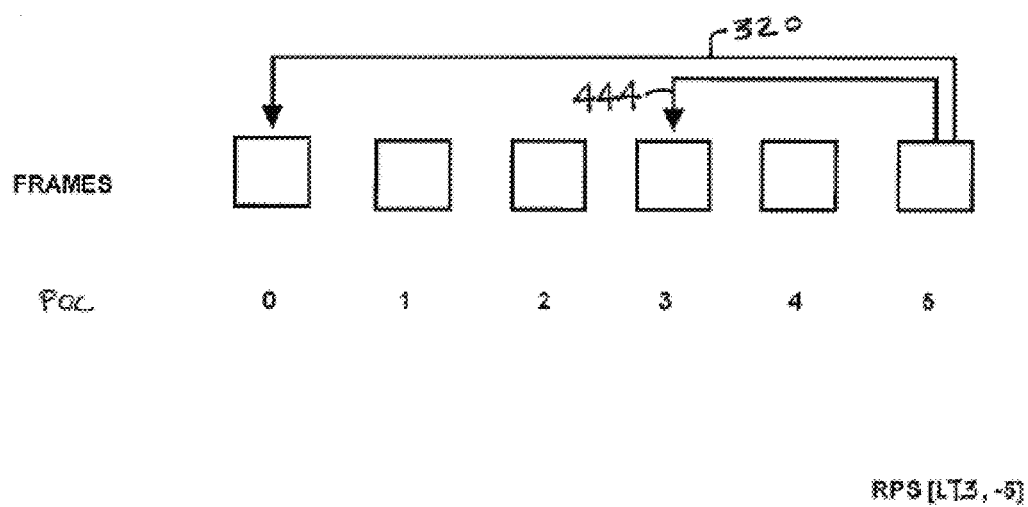
FIG. 8 illustrates reconstruction of an entropy slice with a long term picture value.

Referring to FIG. 8, another technique for signaling the reference frames is to use an absolute reference, generally referred to as a long term picture, in the RPS associated with a frame. The decoding process, such as the motion vector prediction technique, may be different depending if the reference frame is signaled using an absolute reference or a relative reference. The absolute reference (referred to as LT for convenience) refers to a particular LSB count value associated with a reference frame, such as a previous or subsequent frame. For example, the absolute reference of LT=3 (LT3) would refer to a reference frame having a POC LSB value of 3. Accordingly, a RPS of [LT3, −5] would refer to a reference frame having POC LSB value of 3 and a reference frame with a POC equal to the POC of the current frame minus 5. In FIG. 8, this corresponds to the reference frame with POC equal to 3 444 and the reference frame with POC equal to 0 320. Typically, the LT3 refers to the first previous frame relative to the current frame having a POC LSB value of 3. In one embodiment, LT3 refers to the first previous frame relative to the current frame in output order having a POC LSB value of 3. In a second embodiment, LT3 refers to the first previous frame relative to the current frame in transmission order having a POC LSB value of 3. While such a system is suitable for many bit streams, it is not sufficiently robust to select a frame with a LSB count value of 3 that is different than the immediately previous frame having a LSB count value of 3.

Figure 9:
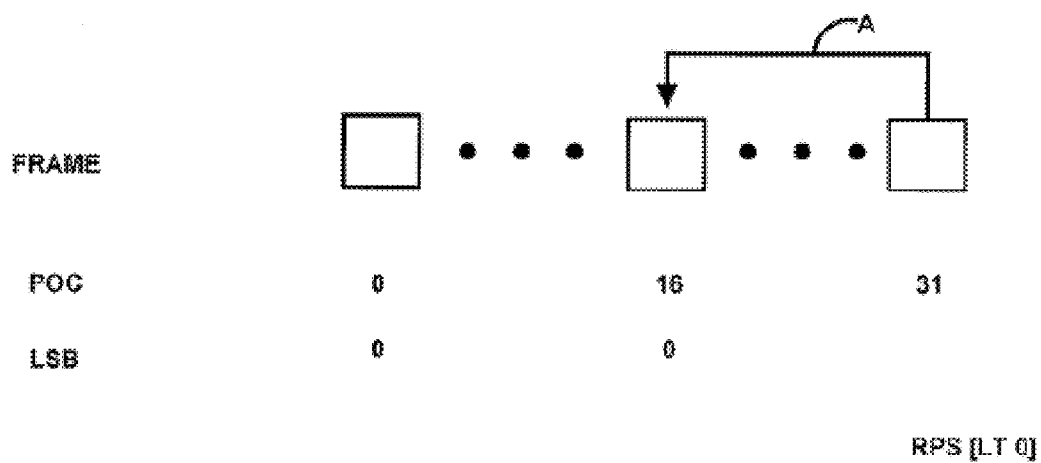
FIG. 9 illustrates reconstruction of an entropy slice by selecting a first preceding frame with a long term picture value.

Referring to FIG. 9, for example, if the encoder was encoding frame 31 (POC=31) and the system signals the use of the long term picture with POC LSB=0 (LT0), then this would refer A to frame 16 (POC=16) since it is the first previous frame with LSB=0. However, the encoder may desire to signal the long term picture frame 0, which likewise has a LSB count value of 0, but this may not be accomplished with such a first previous referencing scheme. To overcome this limitation, one technique is to increase the number of least significant bits used to signal the long term frame LSB, or POC LSB. While such an increase in the number of least significant bits is possible, it results in substantial additional bits being added to the bitstream.

A more preferred technique that results in fewer additional bits being added to the bitstream is to signal a different long term picture than the first immediately preceding frame with a corresponding POC LSB value. For example, the system could indicate the RPS of the current frame having an absolute reference as [LT0|2] where the 0 refers to the POC LSB count value and 2 refers to which of the previous frames with POC LSB count value equal to 0 s to use, which in this case would be the second previous POC LSB value of 0 (e.g., frame 0 in FIG. 9). If no second reference is included then the system may default to the immediately preceding frame with a POC LSB=0 [LT0] (e.g., frame 16 in FIG. 9).

In many cases, the frequency of occurrence of the desire to signal a frame that is not the first immediately preceding frame with the corresponding POC LSB value using absolute referencing will be relatively infrequent. To further reduce the overall bit rate indicating which frame to use, while permitting the capability of signaling a different frame than the first immediately preceding frame with the corresponding POC LSB value using absolute referencing, the system may use a duplication technique. For example, the RPS may be structured as follows, [LT0, LT0|3]. The duplication of the LT0 within the same RPS signals the decoder to use a different frame having a POC LSB value of 0, which in this case would be the third previous occurrence of the POC LSB value of 0. In general, aside from the potential that a particular POC LSB value would not be included in a particular cycle of POC LSB values, the desired POC LSB value will correspond to a frame of the indicated previous occurrence.

Figure 10:
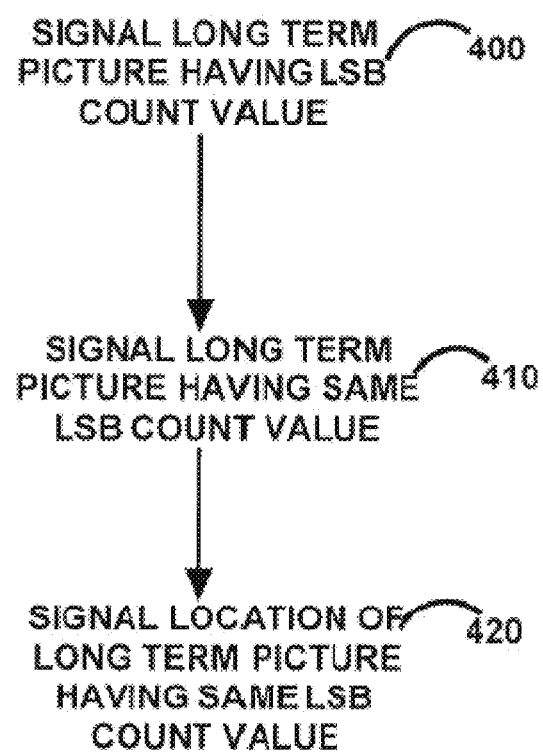
FIG. 10 illustrates reconstruction of an entropy slice by using duplicate long term picture frame having the same least significant bit count value.

Referring to FIG. 10, the duplication technique may be indicated as follows. The RPS includes a signal of a long term picture having a POC LSB value 400 (e.g., [LT3]). The same RPS includes another signal of a long term picture having the same POC LSB value 410 (e.g., [LT3, LT3]). The same RPS includes another signal of the second long term picture having the same LSB count value 410 indicating the location of the desired frame 420 [LT3, LT3|2].

Figure 11A:
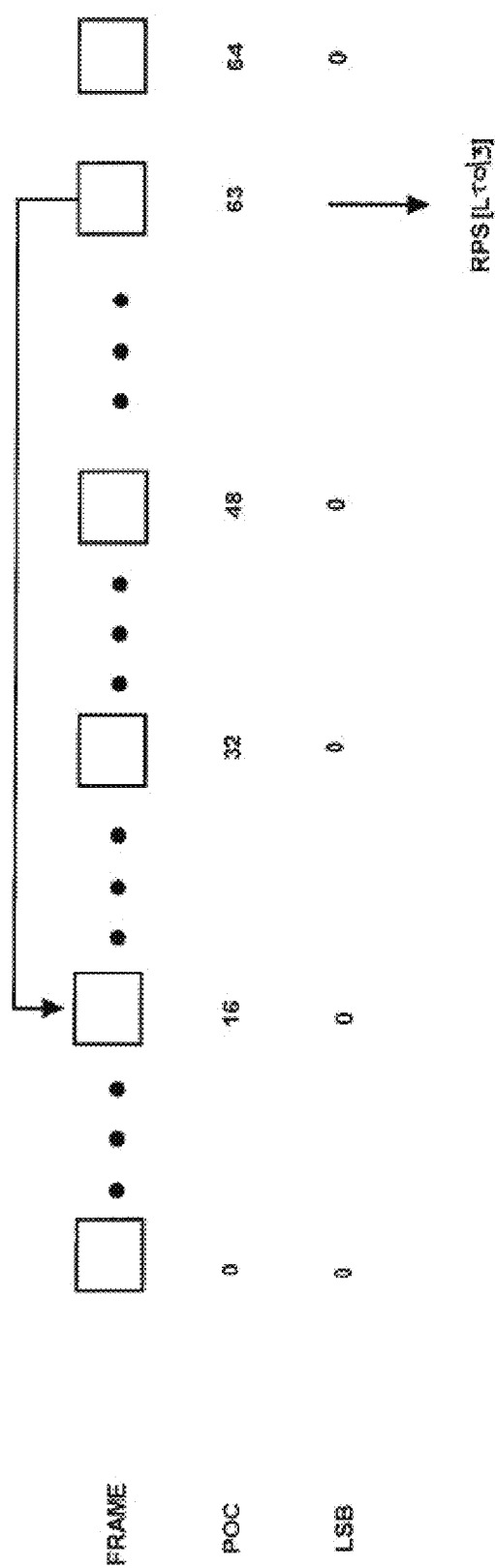
FIG. 11A and FIG. 11B illustrates a technique for selecting a reference frame.
Figure 11B:
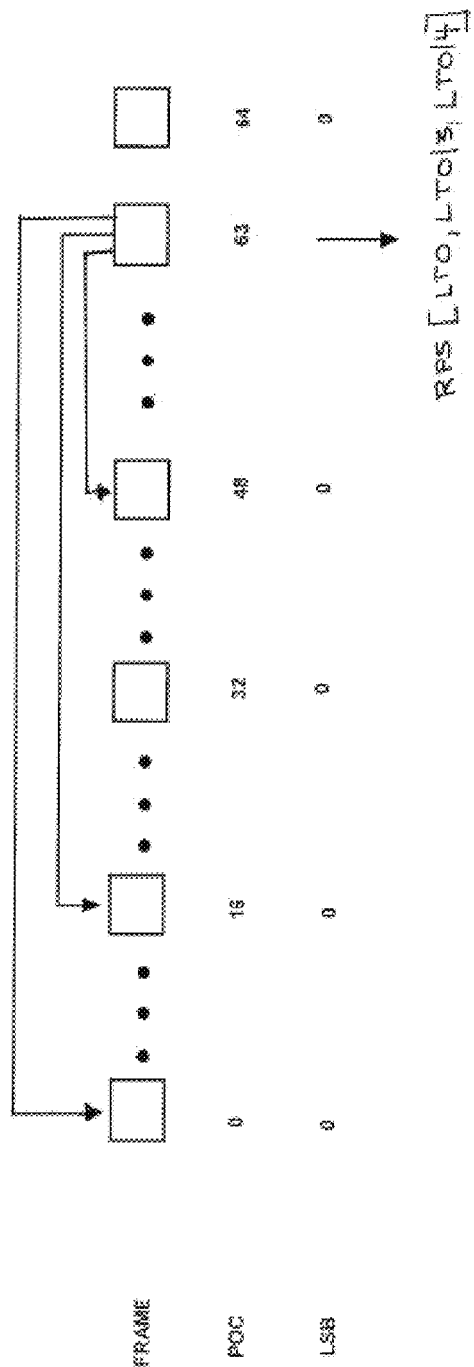
Figure 12:
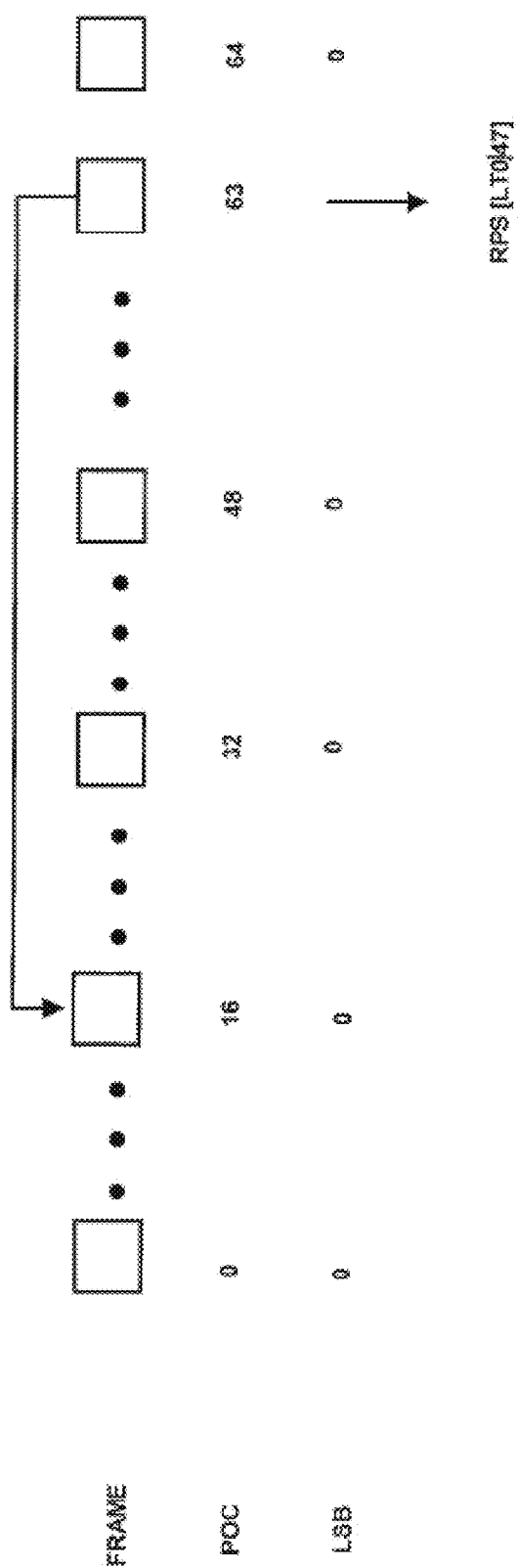
FIG. 12 illustrates another technique for selecting a reference frame.
Figure 13A:
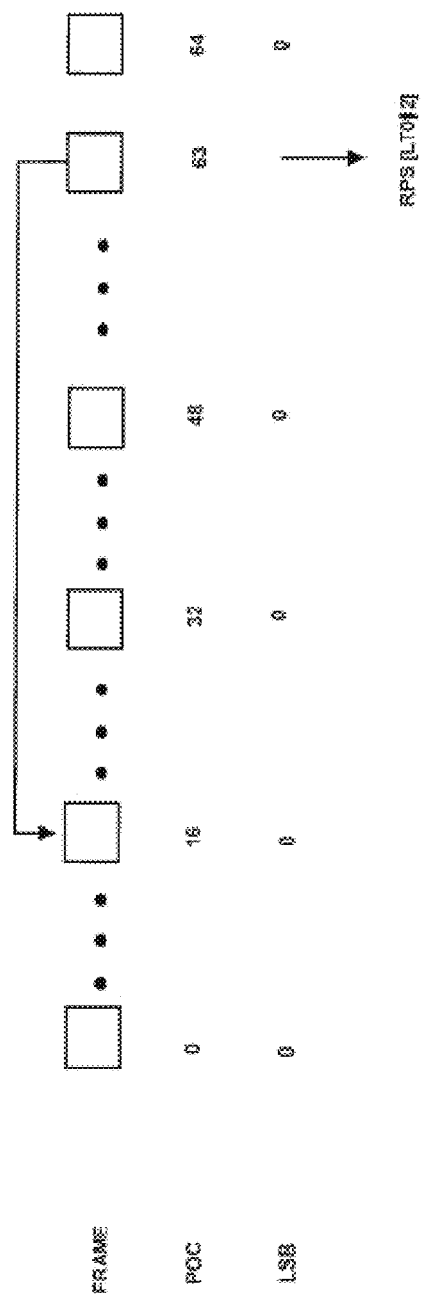
FIG. 13A and FIG. 13B illustrates another technique for selecting a reference frame.
Figure 13B:
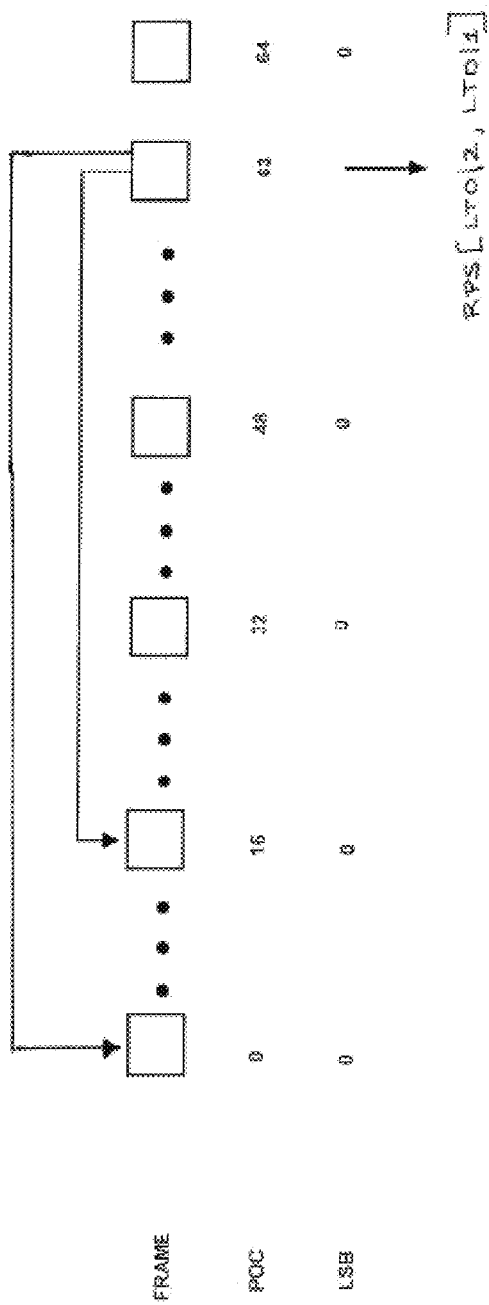
Figure 14:
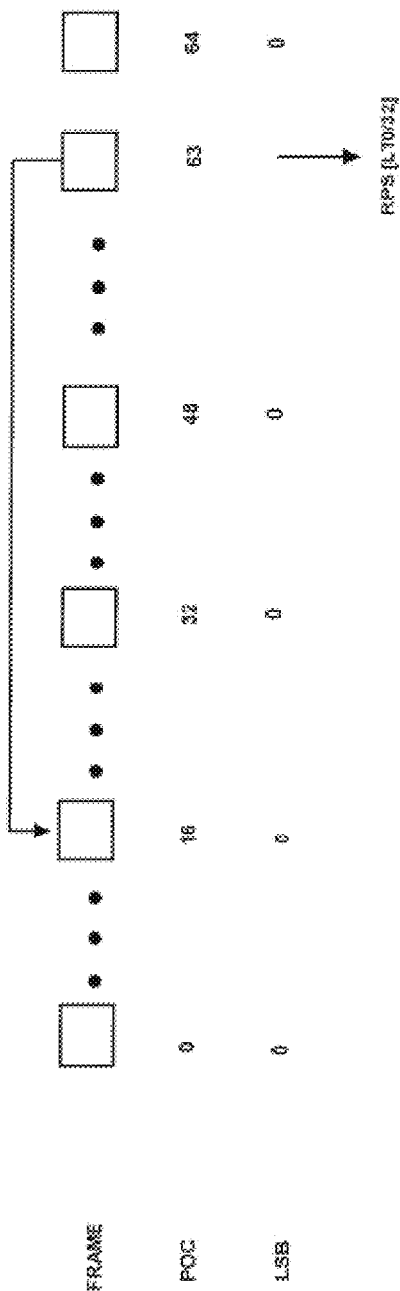
FIG. 14 illustrates another technique for selecting a reference frame.

The signaling of the location of the desired frame may be performed in any suitable manner. Referring to FIG. 11A and FIG. 11B for example, the location may be a number of previous cycles of the POC LSB values for the desired frame relative to the current frame, such as the third previous cycle. Referring to FIG. 12 for example, the location may be based upon an absolute number of frames offset from the current frame. Referring to FIG. 13A and FIG. 13B for example, the location may be based upon a number of previous cycles of the POC LSB values relative to the first immediately preceding frame with the desired POC LSB value. Referring to FIG. 14 for example, the location may be based upon an absolute number of frames offset relative to the first immediately preceding frame with the desired POC LSB value.

One exemplary implementation of such a technique may use the following syntax.

| slice_segment_header( ) { | Descriptor |
|---|---|
|   first_slice_segment_in_pic_flag | u(1) |
|   if( RapPicFlag ) | |
|     no_output_of_prior_pics_flag | u(1) |
|   slice_pic_parameter_set_id | ue(v) |
|   if( !first_slice_segment_in_pic_flag ) { | |
|     if(dependent_slice_segments_enabled_flag ) | |
|       dependent_slice_segment_flag | u(1) |
|     slice_segment_address | u(v) |
|   } | |
|   if( !dependent_slice_segment_flag ) { | |
|     for ( i = 0; i < num_extra_slice_header_bits; i++ ) | |
|       slice_reserved_undetermined_flag[ i ] | u(1) |
|     slice_type | ue(v) |
|     if( output_flag_present_flag ) | |
|       pic_output_flag | u(1) |
|     if( separate_colour_plane_flag == 1 ) | |
|       colour_plane_id | u(2) |
|     if( !IdrPicFlag ) { | |
|       pic_order_cnt_lsb | u(v) |
|       short_term_ref_pic_set_sps_flag | u(1) |
|       if( !short_term_ref_pic_set_sps_flag ) | |
|     short_term_ref_pic_set( num_short_term_ref_pic_sets ) | |
|       else if( num_short_term_ref_pic_sets > 1 ) | |
|         short_term_ref_pic_set_idx | u(v) |
|       if( long_term_ref_pics_present_flag ) { | |
|         if( num_long_term_ref_pics_sps > 0 ) | |
|           num_long_term_sps | ue(v) |
|         num_long_term_pics | ue(v) |
|         for( i = 0; i < num_long_term_sps + num_long_term_pics; i++ ) { | |
|           if( i < num_long_term_sps && num_long_term_ref_pics_sps > 1) | |
|             lt_idx_sps[ i ] | u(v) |
|           else { | |
|             poc_lsb_lt[ i ] | u(v) |
|           used_by_curr_pic_lt_flag[ i ] | u(1) |
|           } | |
|           delta_poc_msb_present_flag[ i ] | u(1) |
|         if( delta_poc_msb_present_flag[ i ] ) | |
|         delta_poc_msb_cycle_lt[ i ] | ue(v) |
|         } | |
|       } | | first_slice_segment_in_pic_flag equal to 1 specifies that the slice segment is the first slice segment of the picture in decoding order. first_slice_segment_in_pic_flag equal to 0 specifies that the slice segment is not the first slice segment of the picture in decoding order.

no_output_of_prior_pics_flag specifies how the previously-decoded pictures in the decoded picture buffer are treated after decoding of an IDR or a BLA picture. When the current picture is a CRA picture, or the current picture is an IDR or BLA picture that is the first picture in the bitstream, the value of no_output_of_prior_pics_flag has no effect on the decoding process. When the current picture is an IDR or BLA picture that is not the first picture in the bitstream and the value of pic_width_in_luma_samples or pic_height_in_luma_samples or sps_max_dec_pic_buffering[HighestTid]

derived from the active sequence parameter set is different from the value of pic_width_in_luma_samples or pic_height_in_luma_samples or sps_max_dec_pic_buffering [HighestTid] derived from the sequence parameter set active for the preceding picture, no_output_of_prior_pics_flag equal to 1 may (but should not) be inferred by the decoder, regardless of the actual value of no_output_of_prior_pics_flag. Where HighestTid refers to the higest temporal Id value.

slice_pic_parameter_set_id specifies the value of pps_pic_parameter_set for the picture parameter set in use. The value of slice_pic_parameter_set_id shall be in the range of 0 to 63, inclusive.

dependent_slice_segment_flag equal to 1 specifies that the value of each slice segment header syntax element that is not present is inferred to be equal to the value of the corresponding slice segment header syntax element in the slice header. When not present, the value of dependent_slice_segment_flag is inferred to be equal to 0.

The variable SliceAddrRS is derived as follows. If dependent_slice_segment_flag is equal to 0, SliceAddrRS is set equal to slice_segment_address. Otherwise, SliceAddrRS is set equal to SliceAddrRS of the preceding slice segment containing the coding tree block for which the coding tree block address is ctbAddrTStoRS[ctbAddrRStoTS[slice_segment_address]-1].

slice_segment_address specifies the address of the first coding tree block in the slice segment, in coding tree block raster scan of a picture. The length of the slice_segment_address syntax element is Ceil(Log 2(PicSizeInCtbsY)) bits. The value of slice_segment_address shall be in the range of 1 to PicSizeInCtbsY-1, inclusive and the value of slice_segment_address shall not be equal to the value of slice_segment_address of any other coded slice segment NAL unit of the same coded picture. When slice_segment_address is not present, it is inferred to be equal to 0.

The variable CtbAddrinRS, specifying a coding tree block address in coding tree block raster scan of a picture, is set equal to slice_segment_address. The variable CtbAddrinTS, specifying a coding tree block address in tile scan, is set equal to CtbAddrRStoTS[CtbAddrInRS]. The variable CuQpDelta, specifying the difference between a luma quantization parameter for the coding unit containing cu_qp_delta_abs and its prediction, is set equal to 0.

slice_reserved_undetermined_flag[i] has semantics and values that are reserved for future specification by ITU-T|ISO/IEC. Decoders shall ignore the presence and value of slice_reserved_undetermined_flag[i].

slice_type specifies the coding type of the slice according to the following table.

TABLE

| Name association to slice_type | |
|---|---|
| slice_type | Name of slice_type |
| 0 | B (B slice) |
| 1 | P (P slice) |
| 2 | I (I slice) |

When nal_unit_type has a value in the range of 16 to 23, inclusive (RAP picture), slice_type shall be equal to 2.

When sps_max_dec_pic_buffering[TemporalId] is equal to 0, slice_type shall be equal to 2.

pic_output_flag affects the decoded picture output and removal processes. When pic_output_flag is not present, it is inferred to be equal to 1.

colour_plane_id specifies the colour plane associated with the current slice RBSP when separate_colour_plane_flag is equal to 1. The value of colour_plane_id shall be in the range of 0 to 2, inclusive. colour_plane_id equal to 0, 1, and 2 correspond to the Y, Cb, and Cr planes, respectively.

pic_order_cnt_lsb specifies the picture order count modulo MaxPicOrderCntLsb for the current picture. The length of the pic_order_cnt_lsb syntax element is log 2_max_pic_order_cnt_lsb minus4+4 bits. The value of the pic_order_cnt_lsb shall be in the range of 0 to MaxPicOrderCntLsb-1, inclusive. When pic_order_cnt_lsb is not present, pic_order_cnt_lsb is inferred to be equal to 0 in most cases.

short_term_ref_pic_set_sps_flag equal to 1 specifies that the short-term reference picture set of the current picture is created using syntax elements in the active sequence parameter set. short_term_ref_pic_set_sps_flag equal to 0 specifies that the short-term reference picture set of the current picture is created using syntax elements in the short_term_ref_pic_set( )syntax structure in the slice header.

short_term_ref_pic_set_idx specifies the index to the list of the short-term reference picture sets specified in the active sequence parameter set that is used for creation of the reference picture set of the current picture. The syntax element short_term_ref_pic_set_idx is represented by Ceil (Log 2(num_short_term_ref_pic_sets)) bits. When not present, the value of short_term_ref_pic_set_idx is inferred to be equal to 0. The value of short_term_ref_pic_set_idx shall be in the range of 0 to num_short_term_ref_pic_sets-1, inclusive.

The variable StRpsIdx is derived as follows: If short_term_ref_pic_set_sps_flag is equal to 1, StRpsIdx is set equal to short_term_ref_pic_set_idx. Otherwise, StRpsIdx is set equal to num_short_term_ref_pic_sets.

num_long_term_sps specifies the number of candidate long-term reference pictures specified in the active sequence parameter set that are included in the long-term reference picture set of the current picture. The value of num_long_term_sps shall be in the range of 0 to Min(num_long_term_ref_pics_sps, sps_max_dec_pic_buffering[sps_max_sub_layers_minus1]-NumNegativePics[StRpsIdx]-NumPositivePics[StRpsIdx]), inclusive. When not present, the value of num_long_term_sps is inferred to be equal to 0.

num_long_term_pics specifies the number of long-term reference pictures specified in the slice header, which are included in the long-term reference picture set of the current picture. The value of num_long_term_pics shall be in the range of 0 to sps_max_dec_pic_buffering[sps_max_sub_layers_minus1]-NumNegativePics[StRpsIdx]-NumPositivePics[StRpsIdx]-num_long_term_sps, inclusive. When not present, the value of num_long_term_pics is inferred to be equal to 0.

lt_idx_sps[i] specifies an index into the list of candidate long-term reference pictures specified in the active sequence parameter set for identification of the picture that is included in the long-term reference pictur set of the current picture. The number of bits used to represent lt_idx_sps[i] is equal to Ceil(Log 2(num_long_term_ref_pics_sps)). When not present, the value of lt_idx_sps[i] is inferred to be equal to 0. The value of lt_idx_sps[i] shall be in the range of 0 to num_long_term_ref_pics_sps-1, inclusive.

poc_lsb_lt[i] specifies the value of the picture order count modulo MaxPicOrderCntLsb of the i-th long-term reference picture that is included in the long-term reference picture set of the current picture. The length of the poc_lsb_lt[i] syntax element is log 2_max_pic_order_cnt_lsb_minus4+4 bits.

used_by_curr_pic_lt_flag[i] equal to 0 specifies that the i-th long-term reference picture included in the long-term reference picture set of the current picture is not used for reference by the current picture.

The variables PocLsbLt[i] and UsedByCurrPicLt[i] are derived as follows. If i is less than num_long_term_sps, PocLsbLt[i] is set equal to lt_ref_pic_poc_lsb_sps[lt_idx_sps[i]] and UsedByCurrPicLt[i] is set equal to used_by_curr_pic_lt_sps_flag[lt_idx_sps[i]]. Otherwise, PocLsbLt[i] is set equal to poc_lsb_lt[i] and UsedByCurrPicLt[i] is set equal to used_by_curr_pic_lt_flag[i].

delta_poc_msb_present_flag[i] equal to 1 specifies that delta_poc_msb_cycle_lt[i] is present. delta_poc_msb_present_flag[i] equal to 0 specifies that delta_poc_msb_cycle_lt[i] is not present. delta_poc_msb_present_flag[i] shall be equal to 1 when there is more than one reference picture in the decoded picture buffer with picture order count modulo MaxPicOrderCntLsb equal to PocLsbLt[i].

delta_poc_msb_cycle_lt[i] is used to determine the value of the most significant bits of the picture order count value of the i-th long-term reference picture that is included in the long-term reference picture set of the current picture. When delta_poc_msb_cycle_lt[i] is not present, it is inferred to be equal to 0.

The variable DeltaPocMSBCycleLt[i] is derived as follows:

```
if( i = = 0 | | i = = num_long_term_sps )
    DeltaPocMSBCycleLt[ i ] = delta_poc_msb_cycle_lt[ i ]
else
    DeltaPocMSBCycleLt[ i ]    =    delta_poc_msb_cycle_lt[ i ]    +
DeltaPocMSBCycleLt[ i − 1 ]
```

For long term reference picture set the decoding process may be done as follows:

This process is invoked once per picture, after decoding of a slice header but prior to the decoding of any coding unit and prior to the decoding process for reference picture list construction for the slice. This process may result in one or more reference pictures in the DPB being marked as "unused for reference" or "used for long-term reference".

Note that the reference picture set is an absolute description of the reference pictures used in the decoding process of the current and future coded pictures. The reference picture set signalling is explicit in the sense that all reference pictures included in the reference picture set are listed explicitly.

A picture can be marked as "unused for reference", "used for short-term reference", or "used for long-term reference", but only one among these three. Assigning one of these markings to a picture implicitly removes another of these markings when applicable. When a picture is referred to as being marked as "used for reference", this collectively refers to the picture being marked as "used for short-term reference" or "used for long-term reference" (but not both).

When the current picture is the first picture in the bitstream, the DPB is initialized to be an empty set of pictures.

When the current picture is an IDR picture or a BLA picture, all reference pictures currently in the DPB (if any) are marked as "unused for reference".

Short-term reference pictures are identified by their PicOrderCntVal values. Long-term reference pictures are identified either by their PicOrderCntVal values or their pic_order_cnt_lsb values.

Five lists of picture order count values are constructed to derive the reference picture set; PocStCurrBefore, PocStCurrAfter, PocStFoll, PocLtCurr, and PocLtFoll with NumPocStCurrBefore, NumPocStCurrAfter, NumPocStFoll, NumPocLtCurr, and NumPocLtFoll number of elements, respectively.

If the current picture is an IDR picture, PocStCurrBefore, PocStCurrAfter, PocStFoll, PocLtCurr, and PocLtFoll are all set to empty, and NumPocStCurrBefore, NumPocStCurrAfter, NumPocStFoll, NumPocLtCurr, and NumPocLtFoll are all set to 0.

Otherwise, the following applies for derivation of the five lists of picture order count values and the numbers of entries.

```
for( i = 0, j = 0, k = 0; i < NumNegativePics[ StRpsIdx ] ; i++  )
   if(                    UsedByCurrPicS0[ StRpsIdx ][ i ]                    )
     PocStCurrBefore[ j++ ] = PicOrderCntVal    +    DeltaPocS0[ StRpsIdx ][ i ]
   else
     PocStFoll[ k++ ]    =    PicOrderCntVal    +    DeltaPocS0[ StRpsIdx ][ i ]
NumPocStCurrBefore                =                                              j
for( i = 0, j = 0; i < NumPositivePics[ StRpsIdx ]; i++  )
   if(                    UsedByCurrPicS1[ StRpsIdx ][ i ]                    )
     PocStCurrAfter[ j++ ]    =    PicOrderCntVal    +    DeltaPocS1[ StRpsIdx ][ i ]
   else
     PocStFoll[ k++ ]    =    PicOrderCntVal    +    DeltaPocS1[ StRpsIdx ][ i ]
NumPocStCurrAfter               =                                              j
NumPocStFoll                    =                                              k
for( i = 0, j = 0, k = 0; i < num_long_term_sps + num_long_term_pics; i++ ) {
   pocLt                       =                                    PocLsbLt[ i ]
   if(                    delta_poc_msb_present_flag[ i ]                    )
     pocLt += PicOrderCntVal − DeltaPocMSBCycleLt[ i ] * MaxPicOrderCntLsb −
pic_order_cnt_lsb
   if(                    UsedByCurrPicLt[ i ]                    )            {
     PocLtCurr[ j ]                =                                     pocLt
     CurrDeltaPocMsbPresentFlag[ j++ ]    =    delta_poc_msb_present_flag[ i ]
   }                              else                                        {
     PocLtFoll[ k ]                =                                     pocLt
     FollDeltaPocMsbPresentFlag[ k++ ]    =    delta_poc_msb_present_flag[ i ]
   }
```

```
     }
    NumPocLtCurr          =                          j
    NumPocLtFoll = k
``` where PicOrderCntVal is the picture order count of the current picture.

In alternative embodiments following semantics may be defined for delta_poc_msb_present_flag[i].

delta_poc_msb_present_flag[i] equal to 1 specifies that delta_poc_msb_cycle_lt[i] is present. delta_poc_msb_present_flag[i] equal to 0 specifies that delta_poc_msb_cycle_lt[i] is not present. delta_poc_msb_present_flag[i] shall be equal to 1 when there is more than one reference picture in the decoded picture buffer with picture order count modulo MaxPicOrderCntLsb equal to PocLsbLt[i]. Once delta_poc_msb_present_flag[i] is set equal to 1 for a current picture based on the above condition then delta_poc_msb_present_flag[i] shall be set to 1 for all subsequent pictures in decoding order until and including the first picture in decoding order which has TemporalId value of 0 and has a NAL unit type as one of the following, TRAIL_R, TSA_R, STSA_R.

In a further alternative embodiment following semantics may be defined for delta_poc_msb_present_flag[i].

delta_poc_msb_present_flag[i] equal to 1 specifies that delta_poc_msb_cycle_lt[i] is present. delta_poc_msb_present_flag[i] equal to 0 specifies that delta_poc_msb_cycle_lt[i] is not present. delta_poc_msb_present_flag[i] shall be equal to 1 when there is more than one reference picture in the decoded picture buffer with picture order count modulo MaxPicOrderCntLsb equal to PocLsbLt[i]. Once delta_poc_msb_present_flag[i] is set equal to 1 for a current picture based on the above condition then delta_poc_msb_present_flag[i] shall be set to 1 for all subsequent pictures in decoding order until and including the first picture in decoding order which has TemporalId value of 0 and has a NAL unit type as as one of the following, TRAIL_R.

In a further alternative embodiment following semantics may be defined for delta_poc_msb_present_flag[i].

delta_poc_msb_present_flag[i] equal to 1 specifies that delta_poc_msb_cycle_lt[i] is present. delta_poc_msb_present_flag[i] equal to 0 specifies that delta_poc_msb_cycle_lt[i] is not present. delta_poc_msb_present_flag[i] shall be equal to 1 when there is more than one reference picture in the decoded picture buffer with picture order count modulo MaxPicOrderCntLsb equal to PocLsbLt[i]. Once delta_poc_msb_present_flag[i] is set equal to 1 for a current picture based on the above condition then delta_poc_msb_present_flag[i] shall be set to 1 for all subsequent pictures in decoding order until and including the first picture in decoding order which has TemporalId value of 0 and has a NAL unit type as as one of the following, TRAIL_R, TSA_R, STSA_R, RADL_R, RASL_R.

In a further alternative embodiment following semantics may be defined for delta_poc_msb_present_flag[i].

delta_poc_msb_present_flag[i] equal to 1 specifies that delta_poc_msb_cycle_lt[i] is present. delta_poc_msb_present_flag[i] equal to 0 specifies that delta_poc_msb_cycle_lt[i] is not present. delta_poc_msb_present_flag[i] shall be equal to 1 when there is more than one reference picture in the decoded picture buffer with picture order count modulo MaxPicOrderCntLsb equal to PocLsbLt[i]. Once delta_poc_msb_present_flag[i] is set equal to 1 for a current picture based on the above condition then delta_poc_msb_present_flag[i] shall be set to 1 for all subsequent pictures in decoding order until and including the first picture in decoding order which has TemporalId value of 0.

In a further alternative embodiment following semantics may be defined for delta_poc_msb_present_flag[i].

delta_poc_msb_present_flag[i] equal to 1 specifies that delta_poc_msb_cycle_lt[i] is present. delta_poc_msb_present_flag[i] equal to 0 specifies that delta_poc_msb_cycle_lt[i] is not present. delta_poc_msb_present_flag[i] shall be equal to 1 when there is more than one reference picture in the decoded picture buffer with picture order count modulo MaxPicOrderCntLsb equal to PocLsbLt[i]. Once delta_poc_msb_present_flag[i] is set equal to 1 for a current picture based on the above condition then delta_poc_msb_present_flag[i] shall be set to 1 for all subsequent pictures in decoding order which have either TemporalId value>0 or have a NAL unit type as one of the following, TRAIL_N, TSA_N, STSA_N, RADL_N, RASL_N, RSV_VCL_N10, RSV_VCL_N12, or RSV_VCL_N14.

In a further alternative embodiment following semantics may be defined for delta_poc_msb_present_flag[i].

delta_poc_msb_present_flag[i] equal to 1 specifies that delta_poc_msb_cycle_lt[i] is present. delta_poc_msb_present_flag[i] equal to 0 specifies that delta_poc_msb_cycle_lt[i] is not present. delta_poc_msb_present_flag[i] shall be equal to 1 when there is more than one reference picture in the decoded picture buffer with picture order count modulo MaxPicOrderCntLsb equal to PocLsbLt[i]. Once delta_poc_msb_present_flag[i] is set equal to 1 for a current picture based on the above condition then delta_poc_msb_present_flag[i] shall be set to 1 for all subsequent pictures in decoding order until and including the first picture in decoding order which has temporal Id value equal to 0 and which is used as a reference picture or is not individually discardable.

In a further alternative embodiment following semantics may be defined for delta_poc_msb_present_flag[i].

delta_poc_msb_present_flag[i] equal to 1 specifies that delta_poc_msb_cycle_lt[i] is present. delta_poc_msb_present_flag[i] equal to 0 specifies that delta_poc_msb_cycle_lt[i] is not present. When there is more than one reference picture in the decoded picture buffer with picture order count modulo MaxPicOrderCntLsb equal to PocLsbLt[i], delta_poc_msb_present_flag[i] shall be equal to 1 for the current picture and for all subsequent pictures in decoding order following the current picture until and including the first picture in decoding order following the current picture which has TemporalId value of 0 and has a NAL unit type as one of the following, TRAIL_R.

In a further alternative embodiment following semantics may be defined for delta_poc_msb_present_flag[i].

delta_poc_msb_present_flag[i] equal to 1 specifies that delta_poc_msb_cycle_lt[i] is present. delta_poc_msb_present_flag[i] equal to 0 specifies that delta_poc_msb_cycle_lt[i] is not present. When there is more than one reference picture in the decoded picture buffer with picture order count modulo MaxPicOrderCntLsb equal to PocLsbLt[i], delta_poc_msb_present_flag[i] shall be equal to 1 for the current picture and for all subsequent pictures in decoding order following the current picture until and including the first picture in decoding order following the current picture which has TemporalId value of 0 and has a NAL unit type as one of the following, TRAIL_R, TSA_R, STSA_R.

In a further alternative embodiment following semantics may be defined for delta_poc_msb_present_flag[i].

delta_poc_msb_present_flag[i] equal to 1 specifies that delta_poc_msb_cycle_lt[i] is present. delta_poc_msb_present_flag[i] equal to 0 specifies that delta_poc_msb_cycle_lt[i] is not present. When there is more than one reference picture in the decoded picture buffer with picture order count modulo MaxPicOrderCntLsb equal to PocLsbLt[i], delta_poc_msb_present_flag[i] shall be equal to 1 for the current picture and for all subsequent pictures in decoding order following the current picture until and including the first picture in decoding order following the current picture which has TemporalId value of 0 and has a NAL unit type as one of the following, TRAIL_R, TSA_R, STSA_R, RADL_R, RASL_R.

In a further alternative embodiment following semantics may be defined for delta_poc_msb_present_flag[i].

delta_poc_msb_present_flag[i] equal to 1 specifies that delta_poc_msb_cycle_lt[i] is present. delta_poc_msb_present_flag[i] equal to 0 specifies that delta_poc_msb_cycle_lt[i] is not present. When there is more than one reference picture in the decoded picture buffer with picture order count modulo MaxPicOrderCntLsb equal to PocLsbLt[i], delta_poc_msb_present_flag[i] shall be equal to 1 for the current picture and for all subsequent pictures in decoding order following the current picture which have either TemporalId value>0 or have a NAL unit type as one of the following, TRAIL_N, TSA_N, STSA_N, RADL_N, RASL_N, RSV_VCL_N10, RSV_VCL_N12, or RSV_VCL_N14.

In a further alternative embodiment following semantics may be defined for delta_poc_msb_present_flag[i].

delta_poc_msb_present_flag[i] equal to 1 specifies that delta_poc_msb_cycle_lt[i] is present. delta_poc_msb_present_flag[i] equal to 0 specifies that delta_poc_msb_cycle_lt[i] is not present. When there is more than one reference picture in the decoded picture buffer with picture order count modulo MaxPicOrderCntLsb equal to PocLsbLt[i], delta_poc_msb_present_flag[i] shall be equal to 1 for the current picture and for all subsequent pictures in decoding order following the current picture until and including the first picture in decoding order following the current picture which has TemporalId value of 0.

In a further alternative embodiment following semantics may be defined for delta_poc_msb_present_flag[i].

delta_poc_msb_present_flag[i] equal to 1 specifies that delta_poc_msb_cycle_lt[i] is present. delta_poc_msb_present_flag[i] equal to 0 specifies that delta_poc_msb_cycle_lt[i] is not present. When there is more than one reference picture in the decoded picture buffer with picture order count modulo MaxPicOrderCntLsb equal to PocLsbLt[i], delta_poc_msb_present_flag[i] shall be equal to 1 for the current picture and for all subsequent pictures in decoding order following the current picture until and including the first picture in decoding order following the current picture which has TemporalId value of 0 and and which is used as a reference picture or is not individually discardable.

Where a nal_unit_type is defined with the following semantics.

nal_unit_type specifies the type of RBSP data structure contained in the NAL unit as specified in the following table y.

TABLE Y

NAL unit type codes and NAL unit type classes

| nal_unit_type | Name_of _nal_unit_type | Content of NAL unit and RBSP syntax structure | NAL unit type class |
| --- | --- | --- | --- |
| 0, 1 | TRAIL_N, TRAIL_R | Coded slice segment of a non-TSA, non-STSA trailing picture slice_segment_layer_rbsp( ) | VCL |
| 2, 3 | TSA_N, TSA_R | Coded slice segment of a TSA picture slice_segment_layer_rbsp( ) | VCL |
| 4, 5 | STSA_N, STSA_R | Coded slice segment of an STSA picture slice_layer_rbsp( ) | VCL |
| 6, 7 | RADL_N, RADL_R | Coded slice segment of a RADL picture slice_layer_rbsp( ) | VCL |
| 8, 9 | RASL_N, RASL_R, | Coded slice segment of a RASL picture slice_layer_rbsp( ) | VCL |
| 10, 12, 14 | RSV_VCL_N10 RSV_VCL_N12 RSV_VCL_N14 | Reserved // reserved non-RAP non-reference VCL NAL unit types | VCL |
| 11, 13, 15 | RSV_VCL_R11 RSV_VCL_R13 RSV_VCL_R15 | Reserved // reserved non-RAP reference VCL NAL unit types | VCL |
| 16, 17 18 | BLA_W_LP BLA_W_RADL BLA_N_LP | Coded slice segment of a BLA picture slice_segment_layer_rbsp( ) | VCL |
| 19, 20 | IDR_W_RADL IDR_N_LP | Coded slice segment of an IDR picture slice_segment_layer_rbsp( ) | VCL |
| 21 | CRA_NUT | Coded slice segment of a CRA picture slice_segment_layer_rbsp( ) | VCL |
| 22, 23 | RSV_RAP_VCL22.. RSV_RAP_VCL23 | Reserved // reserved RAP VCL NAL unit types | VCL |
| 24..31 | RSV_VCL24.. RSV_VCL31 | Reserved // reserved non-RAP VCL NAL unit types | VCL |

TABLE Y-continued

NAL unit type codes and NAL unit type classes

| nal_unit_type | Name_of _nal_unit_type | Content of NAL unit and RBSP syntax structure | NAL unit type class |
|---|---|---|---|
| 32 | VPS_NUT | Video parameter set video_parameter_set_rbsp( ) | non-VCL |
| 33 | SPS_NUT | Sequence parameter set seq_parameter_set_rbsp( ) | non-VCL |
| 34 | PPS_NUT | Picture parameter set pic_parameter_set_rbsp( ) | non-VCL |
| 35 | AUD_NUT | Access unit delimiter access_unit_delimiter_rbsp( ) | non-VCL |
| 36 | EOS_NUT | End of sequence end_of_seq_rbsp( ) | non-VCL |
| 37 | EOB_NUT | End of bitsteam end_of_bitstream_rbsp( ) | non-VCL |
| 38 | FD_NUT | Filler data filler_data_rbsp( ) | non-VCL |
| 39, 40 | PREFIX_SEI_NUT SUFFIX_SEI_NUT | Supplemental enhancement information (SEI) sei_rbsp( ) | non-VCL |
| 41..47 | RSV_NVCL41.. RSV_NVCL47 | Reserved | non-VCL |
| 48..63 | UNSPEC48.. UNSPEC63 | Unspecified | non-VCL |

Where following definitions apply.

access unit: A set of NAL units that are associated with each other according to a specified classification rule, are consecutive in decoding order, and contain exactly one coded picture.

In addition to containing the coded slice segment NAL units of the coded picture, an access unit may also contain other NAL units not containing slice segments of the coded picture. The decoding of an access unit always results in a decoded picture.

associated non-VCL NAL unit: A non-VCL NAL unit for which a particular VCL NAL unit is the associated VCL NAL unit of the non-VCL NAL unit.

associated RAP picture: The previous RAP picture in decoding order (if present).

associated VCL NAL unit: For non-VCL NAL units with nal_unit_type equal to EOS_NUT, EOB_NUT, FD_NUT, or SUFFIX_SEI_NUT, or in the range of RSV_NVCL45 ... _ RSV_NVCL47, or in the range of UNSPEC48 . . . UNSPEC63, the preceding VCL NAL unit in decoding order; and for non-VCL NAL units with nal_unit_type equal to other values, the next VCL NAL unit in decoding order.

broken link access (BLA) access unit: An access unit in which the coded picture is a BLA picture.

broken link access (BLA) picture: A RAP picture for which each slice segment has nal_unit_type equal to BLA_W_LP, BLA_W_RADL or BLA_N_LP.

A BLA picture contains only I slices, and may be the first picture in the bitstream in decoding order, or may appear later in the bitstream. Each BLA picture begins a new coded video sequence, and has the same effect on the decoding process as an IDR picture. However, a BLA picture contains syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_RADL, it does not have associated RASL pictures but may have associated RADL pictures, which are specified to be decoded. When a BLA picture has nal_unit_type equal to BLA_N_LP, it does not have any associated leading pictures.

clean random access (CRA) access unit: An access unit in which the coded picture is a CRA picture.

clean random access (CRA) picture: A RAP picture for which each slice segment has nal_unit_type equal to CRA_NUT.

A CRA picture contains only I slices, and may be the first picture in the bitstream in decoding order, or may appear later in the bitstream. A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

filler data NAL units: NAL units with nal_unit_type equal to FD_NUT.

instantaneous decoding refresh (IDR) access unit: An access unit in which the coded picture is an IDR picture.

instantaneous decoding refresh (IDR) picture: A RAP picture for which each slice segment has nal_unit_type equal to IDR_W_RADL or IDR_N_LP.

An IDR picture contains only I slices, and may be the first picture in the bitstream in decoding order, or may appear later in the bitstream. Each IDR picture is the first picture of a coded video sequence in decoding order. When an IDR picture has nal_unit_type equal to IDR_W_RADL, it may have associated RADL pictures. When an IDR picture has nal_unit_type equal to IDR_N_LP, it does not have any associated leading pictures. An IDR picture does not have associated RASL pictures.

long-term reference picture: A picture that is marked as "used for long-term reference".

long-term reference picture set: The two reference picture set lists that may contain long-term reference pictures.

network abstraction layer (NAL) unit: A syntax structure containing an indication of the type of data to follow and bytes containing that data in the form of an RBSP interspersed as necessary with emulation prevention bytes.

network abstraction layer (NAL) unit stream: A sequence of NAL units.

non-reference picture: A picture that is marked as "unused for reference".

A non-reference picture contains samples that cannot be used for inter prediction in the decoding process of subsequent pictures in decoding order.

picture parameter set (PPS): A syntax structure containing syntax elements that apply to zero or more entire coded pictures as determined by a syntax element found in each slice segment header.

prefix SEI NAL unit: An SEI NAL unit that has nal_unit_type equal to PREFIX_SEI_NUT.

random access decodable leading (RADL) access unit: An access unit in which the coded picture is a RADL picture.

random access decodable leading (RADL) picture: A coded picture for which each slice segment has nal_unit_type equal to RADL_NUT.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture.

random access point (RAP) access unit: An access unit in which the coded picture is a RAP picture.

random access point (RAP) picture: A coded picture for which each slice segment has nal_unit_type in the range of 7 to 12, inclusive.

A RAP picture contains only I slices, and may be a BLA picture, a CRA picture or an IDR picture. The first picture in the bitstream must be a RAP picture. Provided the necessary parameter sets are available when they need to be activated, the RAP picture and all subsequent non-RASL pictures in decoding order can be correctly decoded without performing the decoding process of any pictures that precede the RAP picture in decoding order. There may be pictures in a bitstream that contain only I slices that are not RAP pictures.

random access skipped leading (RASL) access unit: An access unit in which the coded picture is a RASL picture.

random access skipped leading (RASL) picture: A coded picture for which each slice segment has nal_unit_type equal to RASL_NUT.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. RASL pictures are not used as reference pictures for the decoding process of non-RASL pictures. When present, all RASL pictures precede, in decoding order, all trailing pictures of the same associated RAP picture.

raw byte sequence payload (RBSP): A syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

raw byte sequence payload (RBSP) stop bit: A bit equal to 1 present within a raw byte sequence payload (RBSP) after a string of data bits. The location of the end of the string of data bits within an RBSP can be identified by searching from the end of the RBSP for the RBSP stop bit, which is the last non-zero bit in the RBSP.

reference picture: A picture that is a short-term reference picture or a long-term reference picture.

A reference picture contains samples that may be used for inter prediction in the decoding process of subsequent pictures in decoding order.

sequence parameter set (SPS): A syntax structure containing syntax elements that apply to zero or more entire coded video sequences as determined by the content of a syntax element found in the picture parameter set referred to by a syntax element found in each slice segment header.

short-term reference picture: A picture that is marked as "used for short-term reference".

step-wise temporal sub-layer access (STSA) access unit: An access unit in which the coded picture is an STSA picture.

step-wise temporal sub-layer access (STSA) picture: A coded picture for which each slice segment has nal_unit_type equal to STSA_R or STSA_N.

An STSA picture does not use pictures with the same TemporalId as the STSA picture for inter prediction reference. Pictures following an STSA picture in decoding order with the same TemporalId as the STSA picture do not use pictures prior to the STSA picture in decoding order with the same TemporalId as the STSA picture for inter prediction reference. An STSA picture enables up-switching, at the STSA picture, to the sub-layer containing the STSA picture, from the immediately lower sub-layer. STSA pictures must have TemporalId greater than 0.

suffix SEI NAL unit: An SEI NAL unit that has nal_unit_type equal to SUFFIX_SEI_NUT.

supplemental enhancement information (SEI) NAL unit: A NAL unit that has nal_unit_type equal to PREFIX_SEI_NUT or SUFFIX_SEI_NUT.

temporal sub-layer access (TSA) access unit: An access unit in which the coded picture is a TSA picture.

temporal sub-layer access (TSA) picture: A coded picture for which each slice segment has nal_unit_type equal to TSA_R or TSA_N.

A TSA picture and pictures following the TSA picture in decoding do not use pictures with TemporalId greater than or equal to that of the TSA picture for inter prediction reference. A TSA picture enables up-switching, at the TSA picture, to the sub-layer containing the TSA picture or any higher sub-layer, from the immediately lower sub-layer. TSA pictures must have TemporalId greater than 0.

trailing picture: A picture that follows the associated RAP picture in output order.

video coding layer (VCL) NAL unit: A collective term for coded slice segment NAL units and the subset of NAL units that have reserved values of nal_unit_type that are classified as VCL NAL units.

video parameter set (VP S): A syntax structure containing syntax elements that apply to zero or more entire coded video sequences as determined by the content of a syntax element found in the sequence parameter set referred to by a syntax element found in the picture parameter set referred to by a syntax element found in each slice segment header.

Where the temporal Id value is defined as follows.

nuh_temporal_id_plus1 minus 1 specifies a temporal identifier for the NAL unit. The value of nuh_temporal_id_plus1 shall not be equal to 0.

The variable TemporalId is specified as $$TemporalId = nuh\_temporal\_id\_plus1 - 1$$

If nal_unit_type is in the range of 16 to 23 (coded slice segment of a RAP picture), inclusive, TemporalId shall be equal to 0; otherwise, when nal_unit_type is equal to TSA_R, TSA_N, STSA_R, or STSA_N, TemporalId shall not be equal to 0.

The value of TemporalId shall be the same for all VCL NAL units of an access unit. The value of TemporalId of an access unit is the value of the TemporalId of the VCL NAL units of the access unit.

Figure 15:
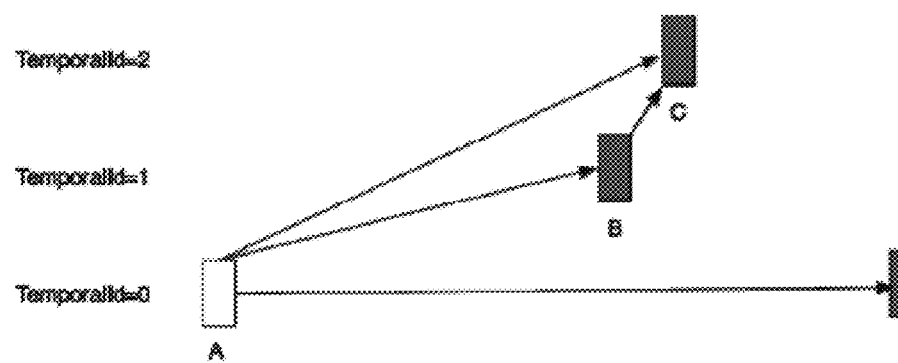
FIG. 15 illustrates pictures for which delta_poc_msb_present_flag[i] is set to 1.
Figure 15:

Referring to FIG. 15 for example, for the picture B there are more than one reference picture in the decoded picture buffer with picture order count modulo MaxPicOrderCntLsb equal to PocLsbLt[i], so delta_poc_msb_present_flag[i] shall be equal to 1. Then as per the embodiments described here, the delta_poc_msb_present_flag[i] is also set to 1 for pictures C, and D. Since picture D belongs to TemporalID=0, the pictures in decoding order subsequent to D do not need to set the delta_poc_msb_present_flag[i] to 1 unless there are more than one reference picture in the decoded picture buffer with picture order count modulo MaxPicOrderCntLsb equal to PocLsbLt[i] for those subsequent pictures.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of decoding a current picture of a video stream, including:
   receiving a reference picture set identifying previously decoded pictures that are indicated as reference pictures in a decoded picture buffer containing said previously decoded pictures, wherein said previously decoded pictures are used for subsequent decoding, and wherein said reference pictures in said reference picture set are identified by picture order count values represented by at least one bit including a least significant bit;
   receiving said current picture together with said reference picture set for said current picture; and
   receiving a delta picture order count most significant bit presence flag indicating whether a delta picture order count most significant bit cycle is present or not present,
   wherein said delta picture order count most significant bit cycle being present indicates that more than one reference picture in said decoded picture buffer have a same value for the least significant bit of said picture order count,
   wherein an identified previous picture is one of said previously decoded pictures having a temporal ID being equal to zero,
   wherein said identified previous picture is not a random access skipped leading (RASL) picture,
   wherein said identified previous picture is not a random access decodable leading (RADL) picture, and
   wherein said identified previous picture is not a sub-layer non-reference picture.

2. An electronic device for decoding a current picture of a video stream, the electronic device comprises a frame memory and an entropy decoding module;
   wherein the frame memory is configured to receive a reference picture set identifying previously decoded pictures that are indicated as reference pictures in a decoded picture buffer containing said previously decoded pictures, wherein said previously decoded pictures were decoded by the electronic device, wherein said previously decoded pictures are used for subsequent decoding, and wherein said reference pictures in said reference picture set are identified by picture order count values represented by at least one bit including a least significant bit;
   wherein the frame memory is further configured to receive said current picture together with said reference picture set for said current picture; and
   wherein the entropy coding module is configured to receive a delta picture order count most significant bit presence flag indicating whether a delta picture order count most significant bit cycle is present or not present,
   wherein said delta picture order count most significant bit cycle being present indicates that more than one reference picture in said decoded picture buffer have same value for the least significant bit of said picture order count,
   wherein an identified previous picture is one of said previously decoded pictures having a temporal ID being equal to zero,
   wherein said identified previous picture is not a random access skipped leading (RASL) picture,
   wherein said identified previous picture is not a random access decodable leading (RADL) picture, and
   wherein said identified previous picture is not a sub-layer non-reference picture.

3. A method of decoding a current picture of a video stream comprising:
   receiving a first syntax element from the video stream;
   deriving a least significant bit value of a picture order count value of a reference picture of the current picture based on the first syntax element;
   receiving a second syntax element from the video stream, the second syntax element indicates whether a delta picture order count most significant bit cycle of the reference picture is present or not present; and
   deriving the picture order count value of the reference picture based on the first syntax element and the second syntax element,
   wherein the second syntax element indicates a delta picture order count most significant bit cycle of the reference picture is present when more than one picture order count value of pictures in a decoded picture buffer modulo MaxPicOrderCntLsb is equal to a same value based on the first syntax element,
   wherein the decoded picture buffer including a first picture, previously decoded pictures between the first picture and the current picture and all reference pictures of the first picture,
   wherein the first picture has a temporal ID being equal to zero,
   wherein the first picture is not a random access skipped leading (RASL) picture,
   wherein the first picture is not a random access decodable leading (RADL) picture, and
   wherein the first picture is not a sub-layer non-reference picture.

4. The method of claim 3, wherein the first syntax element is poc_lsb_lt, which specifies the picture order count value modulo MaxPicOrderCntLsb of the reference picture.

5. The method of claim 3, wherein the second syntax element is delta_poc_msb_present_flag, which specifies whether a delta picture order count most significant bit cycle of the reference picture is present or not present.

6. An electronic device for decoding a current picture of a video stream, the electronic device comprises a frame memory and an entropy decoding module;
   wherein the entropy decoding module is configured to receive a first syntax element from the video stream;

wherein the frame memory is configured to derive a least significant bit value of a picture order count value of a reference picture of the current picture based on the first syntax element;

wherein the entropy decoding module is configured to receive a second syntax element from the video stream, and the second syntax element indicates whether a delta picture order count most significant bit cycle of the reference picture is present or not present; and wherein the frame memory is configured to derive the picture order count value of the reference picture based on the first syntax element and the second syntax element, wherein the second syntax element indicates a delta picture order count most significant bit cycle of the reference picture is present when more than one picture order count value of pictures in a decoded picture buffer modulo MaxPicOrderCntLsb is equal to the least significant bit value, wherein the decoded picture buffer including a first picture, previously decoded pictures between the first picture and the current picture and all reference pictures of the first picture, wherein the first picture has a temporal ID being equal to zero, wherein the first picture is not a random access skimped leading (RASL) picture, wherein the first picture is not a random access decodable leading (RADL) picture, and wherein the first picture is not a sub-layer non-reference picture.

7. The electronic device of claim 6, wherein the first syntax element is poc_lsb_lt, which specifies the picture order count value modulo MaxPicOrderCntLsb of the reference picture.

8. The electronic device of claim 6, wherein the second syntax element is delta_poc_msb_present_flag, which specifies whether a delta picture order count most significant bit cycle of the reference picture is present or not present.

* * * * *

UNITED STATES PATENT AND TRADEMARK OFFICE
CERTIFICATE OF CORRECTION

PATENT NO. : 10,230,979 B2  
APPLICATION NO. : 15/480158  
DATED : March 12, 2019  
INVENTOR(S) : Sachin G. Deshpande Page 1 of 1

It is certified that error appears in the above-identified patent and that said Letters Patent is hereby corrected as shown below:

Page 2, Other Publications, Line 54 "Weigand et al.," should read -- Wiegand et al., --.

Claim 6, Column 26, Line 5 "random access skimped" should read -- random access skipped --.

Signed and Sealed this  
Fourteenth Day of January, 2020

Andrei Iancu  
*Director of the United States Patent and Trademark Office*